(12) United States Patent
Hazuku et al.

(10) Patent No.: US 12,292,275 B2
(45) Date of Patent: May 6, 2025

(54) SCALE THICKNESS ESTIMATING SYSTEM, SCALE THICKNESS ESTIMATING METHOD, AND SCALE THICKNESS ESTIMATING PROGRAM

(71) Applicant: NATIONAL UNIVERSITY CORPORATION TOKYO UNIVERSITY OF MARINE SCIENCE AND TECHNOLOGY, Tokyo (JP)

(72) Inventors: Tatsuya Hazuku, Tokyo (JP); Motoaki Morita, Tokyo (JP)

(73) Assignee: NATIONAL UNIVERSITY CORPORATION TOKYO UNIVERSITY OF MARINE SCIENCE AND TECHNOLOGY, Tokyo (JP)

( * ) Notice: Subject to any disclaimer, the term of this patent is extended or adjusted under 35 U.S.C. 154(b) by 1069 days.

(21) Appl. No.: 17/048,527

(22) PCT Filed: Apr. 3, 2019

(86) PCT No.: PCT/JP2019/014750
§ 371 (c)(1),
(2) Date: Oct. 16, 2020

(87) PCT Pub. No.: WO2019/202981
PCT Pub. Date: Oct. 24, 2019

(65) Prior Publication Data
US 2021/0108917 A1 Apr. 15, 2021

(30) Foreign Application Priority Data
Apr. 17, 2018 (JP) .................. 2018-079246

(51) Int. Cl.
*G01K 17/00* (2006.01)
*F23J 3/02* (2006.01)
(Continued)

(52) U.S. Cl.
CPC .............. *G01B 21/085* (2013.01); *F23J 3/02* (2013.01); *F23M 5/08* (2013.01)

(58) Field of Classification Search
None
See application file for complete search history.

(56) References Cited

U.S. PATENT DOCUMENTS

| | | |
|---|---|---|
| 3,913,378 A | 10/1975 | Hausler |
| 6,499,876 B1 | 12/2002 | Baginksi et al. |

(Continued)

FOREIGN PATENT DOCUMENTS

| | | |
|---|---|---|
| EP | 1760401 A2 | 3/2007 |
| JP | S54-107 62 A | 1/1979 |

(Continued)

OTHER PUBLICATIONS

PCT International Preliminary Report on Patentability, PCT Application No. PCT/JP2019/014750, Oct. 29, 2020, nine pages.

(Continued)

*Primary Examiner* — Erica S Lin
(74) *Attorney, Agent, or Firm* — WTA Patents

(57) ABSTRACT

A scale thickness estimating system according an embodiment includes: a fluid temperature acquiring unit that acquires a temperature of a fluid flowing in a pipe; a flow path outer surface-temperature acquiring unit that acquires a temperature of an outer surface of the pipe; a heat flux acquiring unit that acquires a heat flux on the outer surface of the pipe; a flow path wall-thermal conductivity acquiring unit that acquires a flow path wall thermal conductivity of the pipe; a scale thermal conductivity acquiring unit that (Continued)

acquires a scale thermal conductivity of scale depositing on an inner surface of the pipe; and a scale thickness estimating unit that estimates a thickness of the scale based on the temperature of the fluid, the temperature of the outer surface, the heat flux, the flow path wall thermal conductivity, and the scale thermal conductivity.

11 Claims, 17 Drawing Sheets

(51) Int. Cl.
*F23M 5/08* (2006.01)
*G01B 21/08* (2006.01)

(56) References Cited

U.S. PATENT DOCUMENTS

| | | | |
|---|---|---|---|
| 2003/0176602 A1* | 9/2003 | Schmidt | C08F 20/56 526/264 |
| 2008/0298426 A1 | 12/2008 | Koschack et al. | |
| 2011/0308548 A1* | 12/2011 | Amundsen | G01B 21/085 374/7 |
| 2014/0177673 A1* | 6/2014 | Bliss | F28G 15/003 374/165 |
| 2020/0278705 A1* | 9/2020 | Kawamoto | F16K 27/067 |

FOREIGN PATENT DOCUMENTS

| | | |
|---|---|---|
| JP | H08-15189 A | 1/1996 |
| JP | H08-285211 A | 11/1996 |
| JP | 2010-237107 A | 10/2010 |
| JP | 2011-209033 A | 10/2011 |
| JP | 2015-124991 A | 7/2015 |
| JP | 2016-166781 A | 9/2016 |
| KR | 10-2007-0026066 A | 3/2007 |
| WO | WO 2014/099755 A1 | 6/2014 |

OTHER PUBLICATIONS

PCT International Search Report and Written Opinion, PCT Application No. PCT/JP2019/014750, Jul. 2, 2019, 9 pages (with English translation of PCT International Search Report).

European Patent Office, Extended European Search Report, European Patent Application No. 19787832.5, Dec. 3, 2021, eight pages.

* cited by examiner

SCALE THICKNESS ESTIMATING SYSTEM, SCALE THICKNESS ESTIMATING METHOD, AND SCALE THICKNESS ESTIMATING PROGRAM

TECHNICAL FIELD

The present invention relates to a scale thickness estimating system, a scale thickness estimating method, and a scale thickness estimating program for estimating the thickness of scale.

BACKGROUND ART

It has been conventionally known that scale deposits on the inner surface (flow path wall) of a flow path in which a fluid flows. For example, scale deposits on the inner surface of a pipe for conducting hot spring water to a predetermined place, a pipe for conducting cooling water to a power plant, or the like. It is also known that scale deposits on the inner surface of a flow path in a fluid-based heat exchanger or the like.

In the present application, scale refers to substances contained in fluid built up on the inner surface of a flow path or substances deposited from the fluid onto the inner surface of the flow path. For example, scale that deposits on the inner surface of a pipe in which hot spring water flows is metal oxide formed by the deposition of calcium, silica, and the like in the fluid on the inner surface of the pipe. It is also known that deposits such as wax, paraffin, hydrate, and asphaltene built up on the inner surface of a pipe for delivering petroleum. Such deposits are also included in "scale" mentioned in the present application.

Growth of scale leads to making the flow path narrow in a pipe, deteriorating heat transfer performance of a heat exchanger, and the like. Thus, it is necessary to remove the scale by maintenance of the flow path. The removal of scale is performed by dissolving the scale with chemical solutions, scraping the scale, crushing the scale, or the like. In any method, fluid cannot be passed through the flow path during the maintenance. It is therefore desired to minimize the maintenance of the flow path (scale removal).

In addition, the hardness of the scale changes over time, and its density increases after depositing to some extent. For that reason, it becomes difficult to remove the scale as time elapses. It is therefore desired to get the scale deposition condition in the flow path and perform the maintenance at an appropriate timing.

Patent Literature 1 discloses a scale deposition amount estimating system for estimating the amount of scale depositing on the inner wall surface of a cooling pipe of a boiler furnace wall. In order to estimate the thickness of the scale, it is necessary to acquire in advance the relationship between the temperature of the cooling pipe inside the furnace and the temperature of fins outside the furnace and the relationship between the metal surface temperature of a heat transfer pipe and an equivalent heat transfer coefficient.

Patent Literature 2 discloses a scale formation amount monitoring apparatus for monitoring the amount of scale formed in a plant component in contact with water vapor. In order to estimate the thickness of the scale, it is necessary to obtain in advance the growth speed of the scale.

Patent Literature 3 discloses an inner surface scale thickness measuring method. This method uses a calibration curve obtained in advance through an experiment. This calibration curve indicates the relationship between the scale thickness and a temperature difference at a measurement point.

CITATION LIST

Patent Literature

Patent Literature 1: Japanese Patent Laid-Open No. 2015-124991
Patent Literature 2: Japanese Patent Laid-Open No. 8-285211
Patent Literature 3: Japanese Patent Laid-Open No. 54-10762

SUMMARY OF INVENTION

Technical Problem

Although methods for estimating the scale thickness have been conventionally known as described above, in any method, it is necessary to acquire in advance the scale growth speed and correlations between parameters required for estimating the scale thickness. Accordingly, it may take time to start the scale thickness estimation, and the accuracy of the scale thickness estimation may be decreased due to changes in environmental conditions.

Therefore, an object of the present invention is to provide a scale thickness estimating system, a scale thickness estimating method and a scale thickness estimating program, which enable accurate estimation of the thickness of scale formed on the inner surface of a flow path based on values that can be relatively easily measured.

Solution to Problem

A scale thickness estimating system according to the present invention includes:
  a fluid temperature acquiring unit that acquires a temperature of a fluid flowing in a flow path;
  a flow path outer surface-temperature acquiring unit that acquires a temperature of an outer surface of the flow path;
  a heat flux acquiring unit that acquires a heat flux on the outer surface of the flow path;
  a flow path wall-thermal conductivity acquiring unit that acquires a flow path wall thermal conductivity of the flow path;
  a scale thermal conductivity acquiring unit that acquires a scale thermal conductivity of scale depositing on an inner surface of the flow path; and
  a scale thickness estimating unit that estimates a thickness of the scale based on the temperature of the fluid, the temperature of the outer surface, the heat flux, the flow path wall thermal conductivity, and the scale thermal conductivity.

Advantageous Effect of Invention

According to the present invention, it is possible to accurately estimate the thickness of scale formed on the inner surface of a flow path based on values that can be relatively easily measured.

DESCRIPTION OF EMBODIMENTS

The following describes embodiments according to the present invention with reference to the drawings.

First Embodiment

First, a schematic arrangement of a scale thickness estimating system according to a first embodiment will be described with reference to FIG. 1.

A scale thickness estimating system 1 according to the present embodiment is a system for estimating the thickness of scale depositing on the inner surface of a pipe 100 in which a fluid flows. Note that, in the present embodiment, the flow path is a cylindrical flow path formed by the pipe, and the fluid is a thermal fluid such as warm water.

Figure 1:
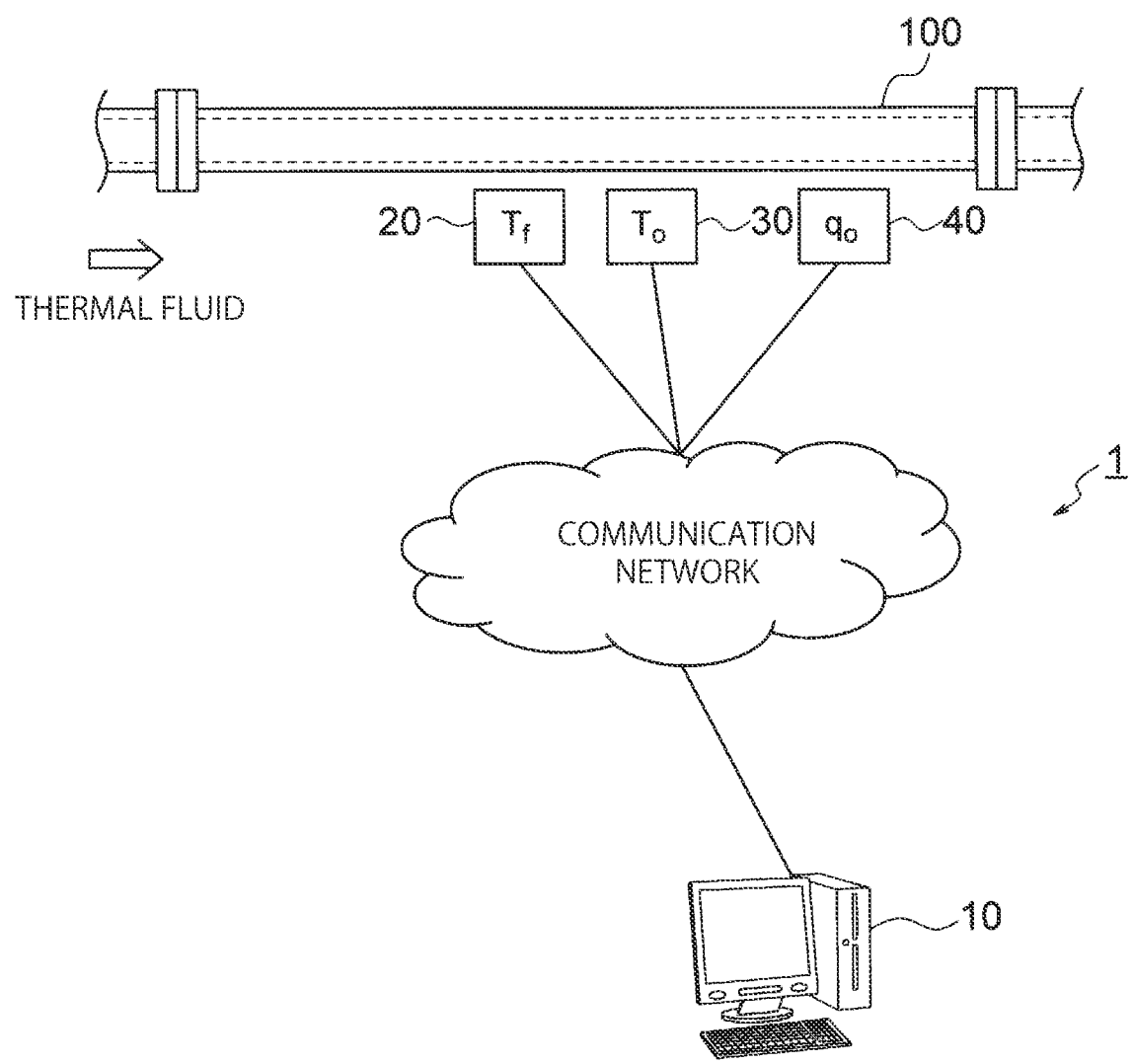
FIG. 1 is a diagram showing a schematic arrangement of a scale thickness estimating system 1 according to a first embodiment.

As shown in FIG. 1, the scale thickness estimating system 1 includes an information-processing apparatus 10, a fluid temperature measuring unit 20, a flow path outer surface-temperature measuring unit 30, and a heat flux measuring unit 40. Note that the flow path outer surface-temperature measuring unit 30 and the heat flux measuring unit 40 may be integrally constituted by using a single sensor capable of concurrently measuring and outputting a temperature and a heat flux.

In the present embodiment, the information-processing apparatus 10 is communicatively connected to the fluid temperature measuring unit 20, the flow path outer surface-temperature measuring unit 30, and the heat flux measuring unit 40 via a communication network. The communication network is the Internet for example, but may also be a small-scale network such as LAN. Note that the communication network may be constructed with either a wired line or a wireless line.

The information-processing apparatus 10 estimates the thickness of scale depositing on the inner surface of the pipe 100 by using data measured by the fluid temperature measuring unit 20, the flow path outer surface-temperature measuring unit 30, and the heat flux measuring unit 40. The information-processing apparatus 10 is a desktop personal computer or a laptop personal computer, but may also be a tablet terminal, a smartphone, or the like.

The fluid temperature measuring unit 20 includes at least one thermocouple and measures the temperature of the fluid flowing in the pipe 100 (hereinafter also referred to as "fluid temperature"). The thermocouple is attached to the peripheral surface of the pipe 100 to penetrate the pipe wall, for example. In the cases of an L-shaped pipe and two pipes connected in an L-shape via a joint, the thermocouple may be attached to the bending portion of the L-shape. This can reduce the effect of the scale depositing on the inner surface of the pipe 100 on the measured temperature.

In addition to the thermocouple, the fluid temperature measuring unit 20 may also include a storage unit (not shown) for storing measured temperature data and a communication unit (not shown) for transmitting the temperature data to the information-processing apparatus 10.

Note that a plurality of thermocouples may be provided along the longitudinal direction of the pipe 100. Also, a plurality of thermocouples may be provided along the circumferential direction of the pipe 100 at a certain longitudinal position.

The flow path outer surface-temperature measuring unit 30 includes at least one thermometer and measures a flow path outer surface temperature. The flow path outer surface temperature refers to the temperature of the outer surface of the flow path, and is the temperature of the outer surface of the pipe 100 in the present embodiment. The thermometer is, for example, a contact thermometer for measuring the flow path outer surface temperature by making contact with the outer surface of the pipe 100. A plurality of thermometers may be provided along the longitudinal direction of the pipe 100. Also, a plurality of thermometers may be provided along the circumferential direction of the pipe 100 at a certain longitudinal position.

Note that the thermometer used may be other than a contact thermometer. For example, a fiber thermometer which enables temperature measurement at a plurality of points with a single temperature sensor or a radiation thermometer which enables to measure the temperature of an object based on electromagnetic waves radiated from the object may be used. In the cases of these thermometers, flow path outer surface temperatures of the pipe 100 at a plurality of positions can be measured without moving the thermometer or providing a plurality of thermometers.

In addition to the thermometer, the flow path outer surface-temperature measuring unit 30 may also include a storage unit (not shown) for storing measured temperature data and a communication unit (not shown) for transmitting the temperature data to the information-processing apparatus 10.

The heat flux measuring unit 40 includes at least one heat flux meter and measures the heat flux on the outer surface of the pipe 100 (hereinafter also simply referred to as "heat flux"). Note that a plurality of heat flux meters may be provided along the longitudinal direction of the pipe 100. Also, a plurality of heat flux meters may be provided along the circumferential direction of the pipe 100 at a certain longitudinal position. In the case of using a film heat flux meter, the heat flux meter is attached on a measurement area of the pipe 100.

Note that, if the heat flux is estimated based on a flow path surrounding temperature and the flow path outer surface temperature as described later, a flow path surrounding temperature measuring unit (not shown) is provided instead of the heat flux measuring unit 40. The flow path surrounding temperature refers to the temperature around the flow path, and is the surrounding temperature of the pipe 100 in the present embodiment.

Next, the details of the information-processing apparatus 10 will be described with reference to FIG. 2.

Figure 2:
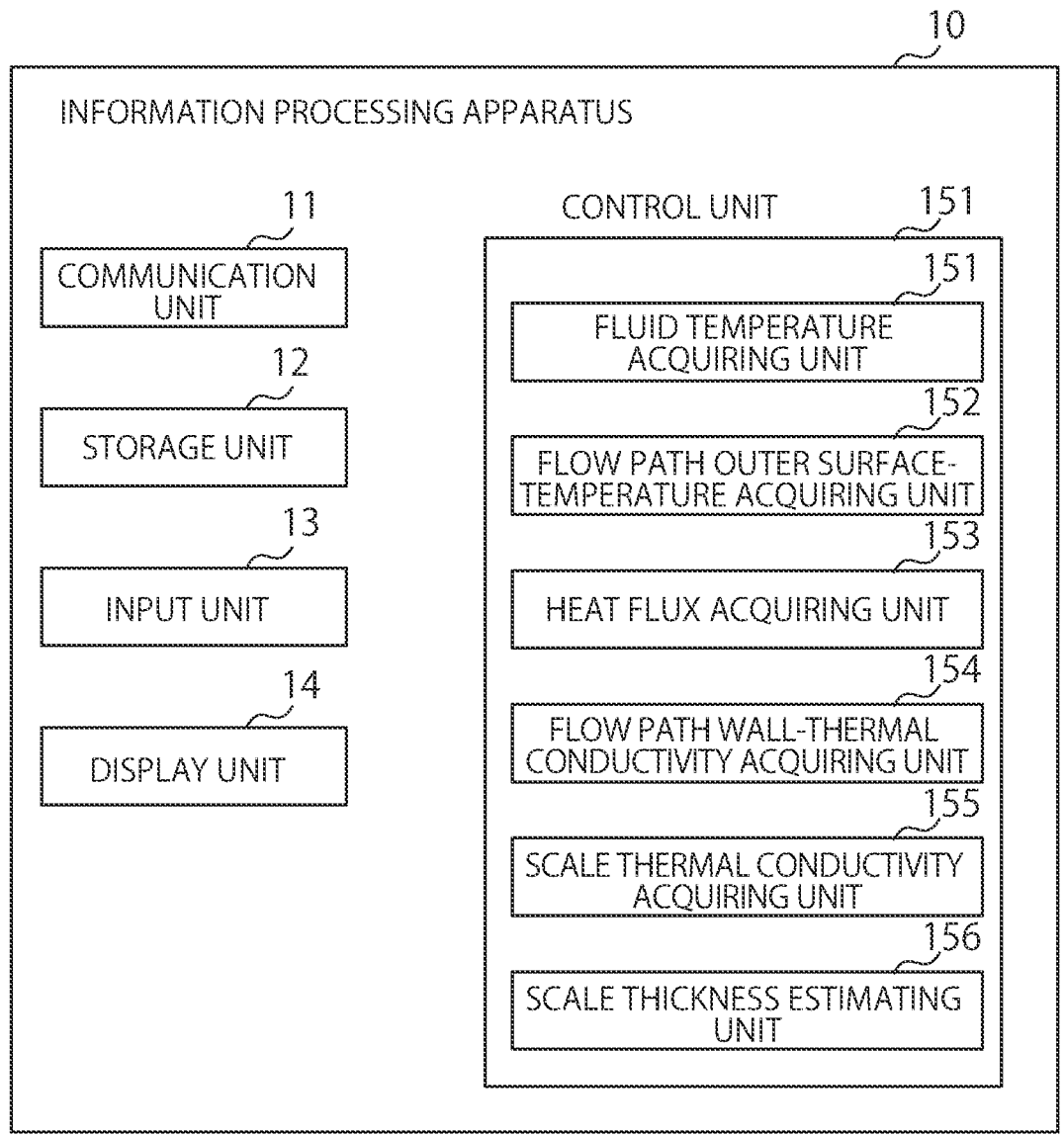
FIG. 2 is a functional block diagram of an information-processing apparatus 10 according to the first embodiment.

As shown in FIG. 2, the information-processing apparatus 10 includes a communication unit 11, a storage unit 12, an input unit 13, a display unit 14, and a control unit 15.

The communication unit 11 is an interface for transmitting and receiving information to and from the fluid temperature measuring unit 20, the flow path outer surface-temperature measuring unit 30, and the heat flux measuring unit 40 via the communication network.

The storage unit 12 is constituted of a semiconductor memory, a hard disk drive, or the like. The storage unit 12 stores data transmitted and received via the communication unit 11, data required for the estimation of the scale thickness (such as a flow path wall thermal conductivity, a scale thermal conductivity, the pipe diameter and thickness (flow path wall thickness), which will be described later), programs executed in the control unit 15, and the like.

The input unit 13 is an interface for a user to input information to the information-processing apparatus 10, and is, for example, a keyboard, a mouse, a touch panel, a button, a microphone, or the like. Data such as the flow path wall thermal conductivity, the scale thermal conductivity, the pipe diameter and thickness may be input via the input unit 13.

The display unit 14 is a liquid crystal display, an organic EL display, or the like, and displays an estimation result of the scale thickness. The estimation result may be displayed in a numerical value, or may be displayed in a graph as shown in FIG. 5(b), etc.

The control unit 15 is constituted of a central processing unit (CPU), a microprocessor, or the like.

As shown in FIG. 2, the control unit 15 includes a fluid temperature acquiring unit 151, a flow path outer surface-temperature acquiring unit 152, a heat flux acquiring unit 153, a flow path wall-thermal conductivity acquiring unit 154, a scale thermal conductivity acquiring unit 155, and a scale thickness estimating unit 156. In the present embodiment, each unit of the control unit 15 is implemented by a processor in the information-processing apparatus 10 executing a predetermined program. Note that at least one unit of the control unit 15 may be constituted by hardware.

The fluid temperature acquiring unit 151 acquires the temperature of the fluid flowing in the flow path (the pipe 100, in the present embodiment) (the fluid temperature). Specifically, the fluid temperature acquiring unit 151 acquires the fluid temperature measured by the fluid temperature measuring unit 20 via the communication unit 11.

The flow path outer surface-temperature acquiring unit 152 acquires the temperature of the outer surface of the pipe 100 (the flow path outer surface temperature). Specifically, the flow path outer surface-temperature acquiring unit 152 acquires the flow path outer surface temperature measured by the flow path outer surface-temperature measuring unit 30 via the communication unit 11.

The heat flux acquiring unit 153 acquires the heat flux on the outer surface of the pipe 100. Specifically, the heat flux acquiring unit 153 acquires the heat flux measured by the heat flux measuring unit 40 via the communication unit 11.

Note that the communication unit 11 may store data received from the fluid temperature measuring unit 20 and the like in the storage unit 12 and subsequently the fluid temperature acquiring unit 151, the flow path outer surface-temperature acquiring unit 152, and the heat flux acquiring unit 153 may read out the data from the storage unit 12.

The flow path wall-thermal conductivity acquiring unit 154 acquires the flow path wall thermal conductivity of the pipe 100. Specifically, the flow path wall-thermal conductivity acquiring unit 154 reads out, from the storage unit 12, the flow path wall thermal conductivity stored in advance in the storage unit 12. Note that the flow path wall thermal conductivity is a value specific to the material (such as stainless steel or carbon steel) of the pipe 100.

The scale thermal conductivity acquiring unit 155 acquires the scale thermal conductivity of the scale depositing on the inner surface of the pipe 100. Specifically, the scale thermal conductivity acquiring unit 155 reads out, from the storage unit 12, the scale thermal conductivity stored in advance in the storage unit 12. Note that, although the value of the scale thermal conductivity is set empirically in the present embodiment, it may also be set based on a result of analysis of the scale.

The scale thickness estimating unit 156 estimates the thickness of the scale depositing on the pipe 100 based on the fluid temperature, the flow path outer surface temperature, the heat flux, the flow path wall thermal conductivity, and the scale thermal conductivity. In the present embodiment, the scale thickness estimating unit 156 reads out the values of the outer radius and inner radius (or the thickness of the flow path wall) of the pipe 100 from the storage unit 12 to use it for the estimation of the scale thickness.

More specifically, the scale thickness estimating unit 156 calculates the thickness of the scale depositing on the inner surface of the pipe 100 by using equation (1).

[Expression 1]

$$\delta_s \approx r_i \left[ 1 - \frac{1}{\exp\left[\frac{k_s}{r_o}\left\{\frac{T_f - T_o}{q_o} - \frac{r_o \ln(r_o/r_i)}{k_w}\right\}\right]} \right] \quad (1)$$

where "$\delta_s$" is the thickness of the scale [m], "$r_i$" is the inner radius of the pipe [m], "$r_o$" is the outer radius of the pipe [m], "$k_s$" is the scale thermal conductivity [W/(m·K)], "$k_w$" is the flow path wall thermal conductivity [W/(m·K)], "$q_o$" is the heat flux on the outer surface of the pipe [W/m²], "$T_f$" is the fluid temperature [K], and "$T_o$" is the flow path outer surface temperature [K].

Figure 3:
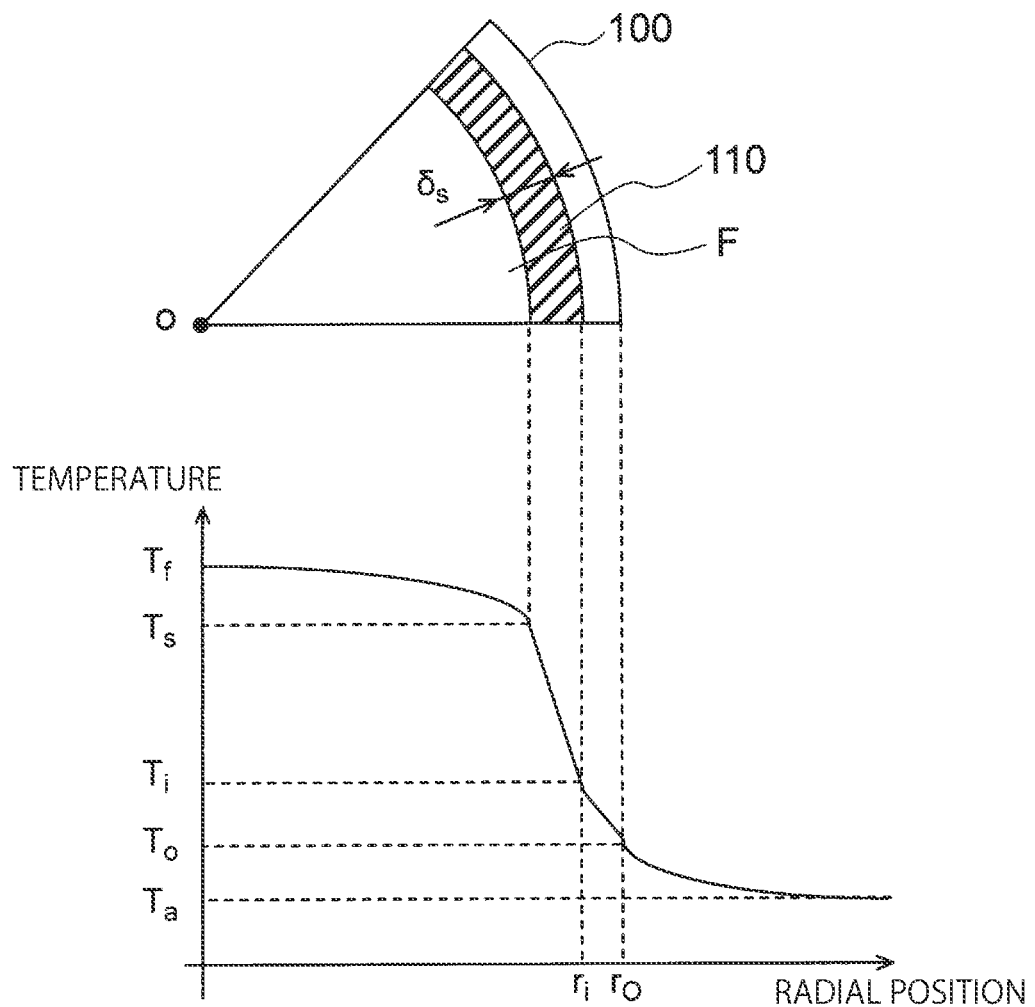
FIG. 3 is a diagram for illustrating temperature distribution inside and outside a pipe 100.

As is clear from equation (1), the scale thickness estimating unit 156 estimates the thickness of the scale without using the surface temperature of the scale (temperature "$T_s$" in FIG. 3). That is, according to the present embodiment, the thickness of the scale can be estimated even when the scale surface temperature, which is difficult to measure, is unknown.

The method for deriving equation (1) will now be described.

As shown in FIG. 3, a system is considered in which a fluid F having a temperature "$T_f$" flows in the cylindrical pipe 100 having an inner radius "$r_i$" and an outer radius "$r_o$" and scale 110 having a thickness "$\delta_s$" deposits on the inner surface of the pipe 100. When a relationship of "$T_f$">"$T_a$" ("$T_a$" is the flow path surrounding temperature) holds in the steady state, an amount of heat transfer "Q" from the inside to the outside of the pipe 100 resulting from this temperature difference is given by equation (2).

[Expression 2]

$$Q = \frac{T_f - T_a}{\frac{1}{2\pi(r_i - \delta_s)Lh_f} + \frac{\ln\left(\frac{r_i}{r_i - \delta_s}\right)}{2\pi LK_s} + \frac{\ln\left(\frac{r_o}{r_i}\right)}{2\pi Lk_w} + \frac{1}{2\pi r_o L h_a}} \quad (2)$$

where "Q" is the amount of heat transfer [W], "$h_f$" is the thermal conductivity between the scale and the fluid [W/(m²·K)], "$h_a$" is the thermal conductivity between the outer surface of the pipe and the surrounding space of the flow path [W/(m²·K)], and "L" is the length in the flow direction [m].

In equation (2), the first term of the denominator on the right side indicates the thermal resistance due to heat transfer from the thermal fluid to the scale, the second term indicates the thermal resistance of the scale, the third term indicates the thermal resistance of the flow path wall (the pipe wall of the pipe), and the fourth term indicates the thermal resistance due to heat transfer from the outer surface of the pipe to the surrounding space of the flow path.

Defining the heat flux on the outer surface of the pipe as "$q_o$", a relationship of $Q=2\pi r_o L q_o$ holds. Using this relationship, equation (3) is obtained from equation (2).

[Expression 3]

$$q_o = \frac{T_f - T_a}{\frac{r_o}{(r_i - \delta_s)h_f} + \frac{r_o \ln\left(\frac{r_i}{r_i - \delta_s}\right)}{k_s} + \frac{r_o \ln\left(\frac{r_o}{r_i}\right)}{k_w} + \frac{1}{h_w}} \quad (3)$$

By transforming equation (3), equation (4) is obtained.

[Expression 4]

$$\delta_s = r_i \left[1 - \frac{1}{\exp\left[\frac{k_s}{r_o}\left\{\frac{T_f - T_a}{q_o} - \frac{r_o \ln(r_o/r_i)}{k_w} - \frac{r_o}{(r_i - \delta_s)h_f} - \frac{1}{h_o}\right\}\right]}\right] \quad (4)$$

Incidentally, in equation (4), equation (5) holds between the thermal conductivity "$h_f$" and the heat flux "$q_o$".

[Expression 5]

$$h = \frac{Q}{2\pi(r_i - \delta_s)L(T_f - T_s)} = \frac{r_a q_o}{(r_i - \delta_s)(T_f - T_s)} \quad (5)$$

where "$T_s$" is the surface temperature of the scale.

Further, in equation (4), equation (6) holds between the thermal conductivity "$h_a$" and the heat flux "$q_o$".

[Expression 6]

$$h_a = \frac{Q}{2\pi r_o L(T_o - T_n)} = \frac{q_o}{(T_o - T_a)} \quad (6)$$

Substituting equation (5) and equation (6) into equation (4) gives equation (7).

[Expression 7]

$$\delta_s = r_i \left[1 - \frac{1}{\exp\left[\frac{k_s}{r_o}\left\{\frac{T_s - T_o}{q_o} - \frac{r_o \ln(r_o/r_i)}{k_w}\right\}\right]}\right] \quad (7)$$

The surface temperature "$T_s$" of the scale is dependent on the thermal conductivity "$h_f$" between the scale and the thermal fluid as indicated in equation (5), and varies with physical property values and the flow rate of the thermal fluid flowing in the pipe and interfacial structures on the scale. On the other hand, the thermal resistance due to heat transfer from the thermal fluid to the scale is significantly smaller than those of the scale and other thermal resistance components. Therefore, if some errors are allowed in a system with the deposited scale, "$T_s$" in equation (7) can be approximated by "$T_f$". In this manner, equation (1) is obtained.

<Scale Thickness Estimating Method>

Figure 4:
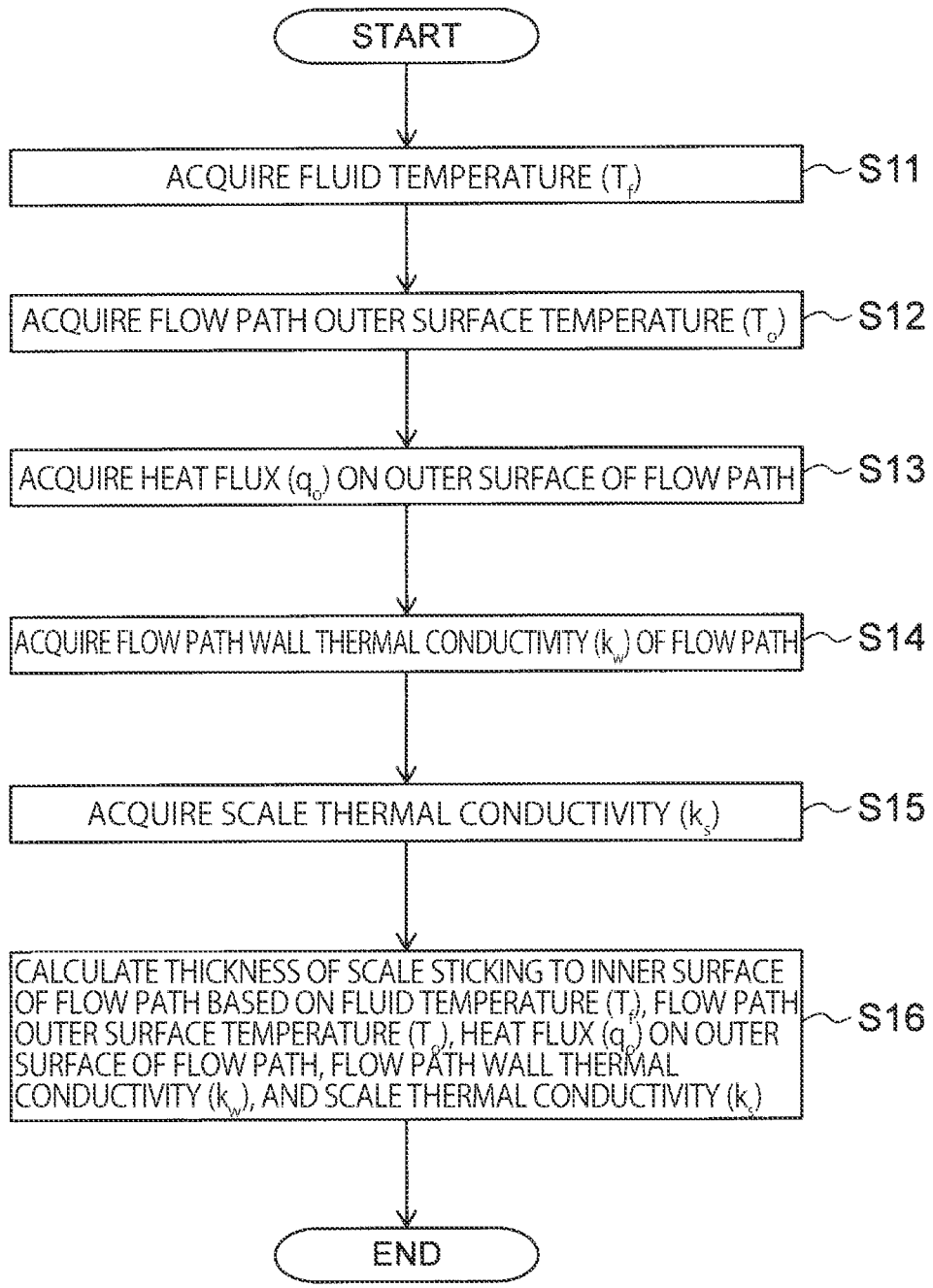
FIG. 4 is a flow chart for illustrating an example of a scale thickness estimating method according to the first embodiment.

An example of a method for estimating the scale thickness according to the present embodiment will be described with reference to the flow chart in FIG. 4.

The fluid temperature acquiring unit 151 acquires the fluid temperature ($T_f$) (step S11). In this step, the temperature of the fluid flowing in the pipe 100 is acquired.

Next, the flow path outer surface-temperature acquiring unit 152 acquires the flow path outer surface temperature ($T_o$) (step S12). In this step, the temperature of the outer surface of the pipe 100 is acquired.

Next, the heat flux acquiring unit 153 acquires the heat flux ($q_o$) on the outer surface of the flow path (step S13). In this step, the heat flux on the outer surface of the pipe 100 is acquired.

Next, the flow path wall-thermal conductivity acquiring unit 154 acquires the flow path wall thermal conductivity ($k_w$) of the flow path (step S14). In this step, the flow path wall thermal conductivity of the pipe 100 is acquired.

Next, the scale thermal conductivity acquiring unit 155 acquires the scale thermal conductivity ($k_s$) of the scale (step S15).

Next, the scale thickness estimating unit 156 estimates the thickness of the scale depositing on the inner surface (flow path wall) of the flow path based on the fluid temperature ($T_f$), the flow path outer surface temperature ($T_o$), the heat flux ($q_o$) on the outer surface of the flow path, the flow path wall thermal conductivity ($k_w$), and the scale thermal conductivity ($k_s$) (step S16).

Note that the processing flow of the estimation method described above is merely an example. For example, the order of performing steps S11 to S15 can be changed appropriately.

It is also possible to estimate the circumferential thickness distribution of the scale by using the temperature "$T_o$" and the heat flux "$q_o$" measured along the outer peripheral surface of the pipe. In this case, the flow path outer surface-temperature acquiring unit 152 acquires flow path outer surface temperature distribution obtained by measuring the temperature of the outer surface of the pipe 100 along a predetermined direction (for example, the circumferential direction, the longitudinal direction, or the like) of the pipe 100. The heat flux acquiring unit 153 acquires heat flux distribution obtained by measuring the heat flux on the outer surface of the pipe 100 along the predetermined direction. The scale thickness estimating unit 156 estimates the distribution of the scale thickness along the predetermined direction of the pipe 100 based on the flow path outer surface temperature distribution and heat flux distribution acquired. Even in the case of a flow path formed by a member other than a pipe, the distribution of the scale thickness can be estimated similarly. For example, in the case of a flow path partitioned by a plate, which will be described later, the distribution of the scale thickness along the longitudinal direction and/or the width direction of the plate may be estimated.

The heat flux acquiring unit 153 may acquire a heat flux estimated based on the flow path outer surface temperature and the flow path surrounding temperature, instead of the heat flux measured by the heat flux meter. Specifically, the heat flux is estimated in the following manner.

The heat flux "$q_o$" on the outer surface of the flow path is represented by the sum of a heat flux "$q_R$" from radiation and a heat flux "$q_C$" from convection as indicated in equation (8).

[Expression 8]

$$q_o = q_R + q_C \quad (8)$$

The heat flux "$q_R$" due to radiation is represented by equation (9).

[Expression 9]

$$q_R = \varepsilon_R \sigma (T_o^4 - T_a^4) \quad (9)$$

where "$\varepsilon_R$" is an emissivity, "$\sigma$" is the Stefan-Boltzmann constant [W/(m²·K⁴)], "$T_o$" is the flow path outer surface temperature [K], and "$T_a$" is the flow path surrounding temperature [K].

The heat flux "$q_C$" due to convection is represented by equation (10).

[Expression 10]

$$q_C = h_C (T_o - T_a) \quad (10)$$

where "$h_C$" is the convective thermal conductivity on the outer surface of the flow path (pipe) [W/(m²·K)], "$T_o$" is the flow path outer surface temperature [K], and "$T_a$" is the flow path surrounding temperature [K].

By using equations (8) to (10), the heat flux "$q_o$" can be calculated based on the flow path outer surface temperature "$T_o$" and the flow path surrounding temperature "$T_a$". Note that the emissivity "$\varepsilon_R$" changes with conditions (such as the material, temperature range, color, and roughness) of the flow path wall. The convective thermal conductivity "$h_C$" changes with surrounding conditions of the flow path (for example, whether the surrounding space of the flow path is sealed or open), the shape of the flow path (such as the flow path diameter), and the arrangement of the flow path (such as vertical arrangement or horizontal arrangement) even under a no-wind condition. The emissivity "$\varepsilon_R$" and the convective thermal conductivity "$h_C$" may use approximate values.

Next, estimation results of the scale thickness will be described with reference to FIG. 5 to FIG. 12. In the calculation of the estimated values of the scale thickness shown below, an approximate value is used as the emissivity "$\varepsilon_R$", and an approximate value for the no-wind condition is used as the convective thermal conductivity "$h_C$".

Figure 5:
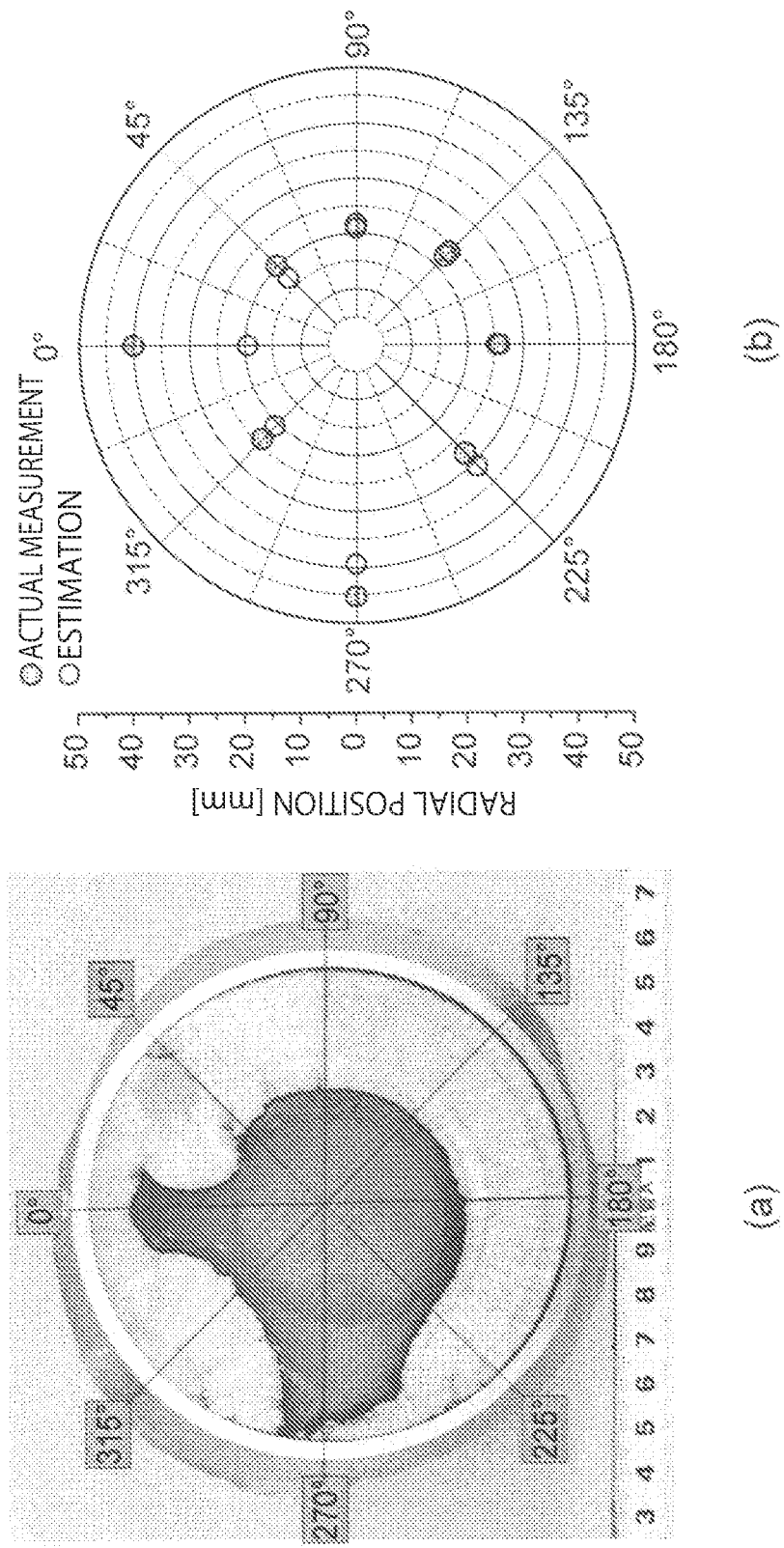
FIG. 5(a) is a photograph showing a cross section of a pipe (straight pipe) in which scale deposits on its inner surface.
FIG. 5(b) is a diagram showing estimated values and actual measured values of the scale thickness.
Figure 6:
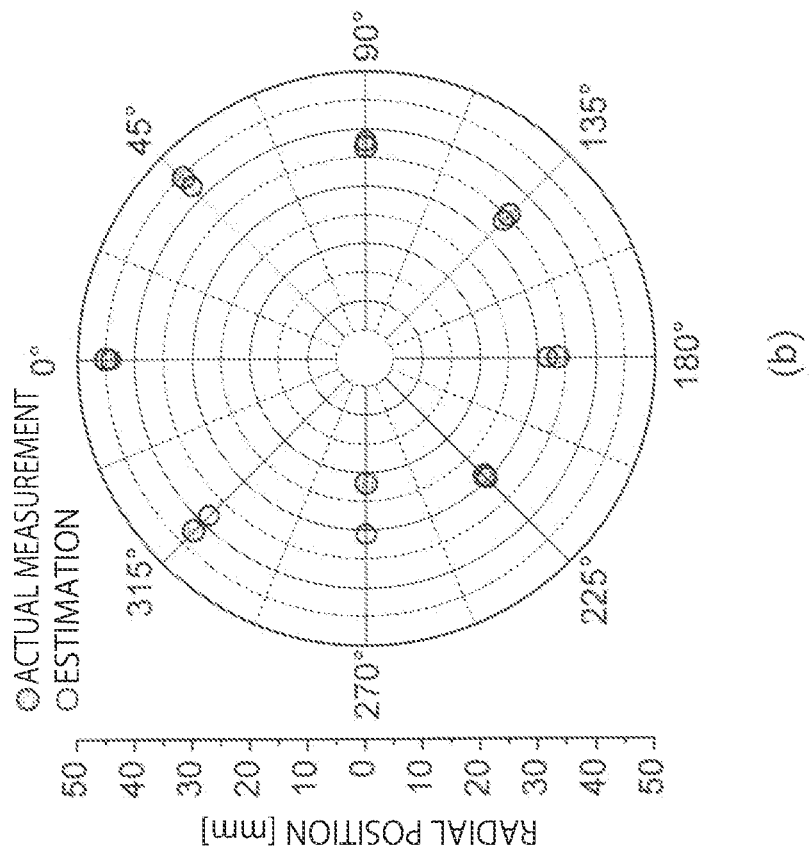
FIG. 6(a) is a photograph showing a cross section of a pipe (irregular-shaped pipe) in which scale deposits on its inner surface.
FIG. 6(b) is a diagram showing estimated values and actual measured values of the scale thickness.
Figure 6:
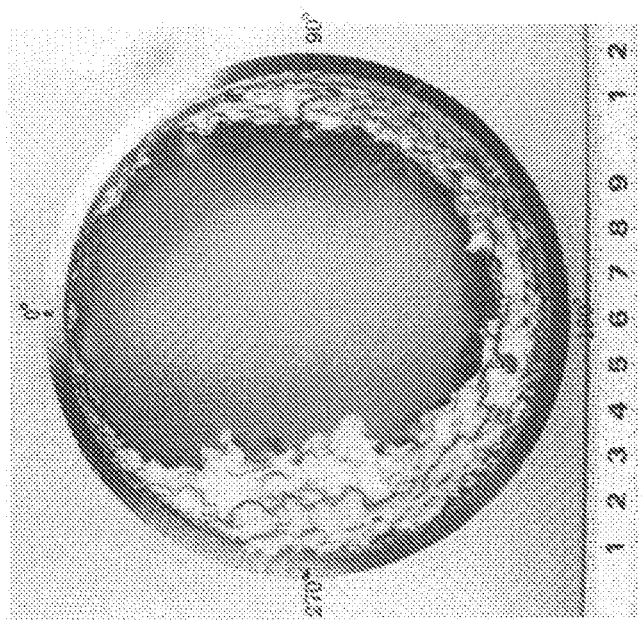

First, results of scale thickness estimation using a straight pipe and a T-shaped pipe as evaluation targets will be described with reference to FIG. 5 and FIG. 6.

FIG. 5(a) is a photograph of a cross-section at an intermediate portion of a pipe (straight pipe) arranged horizontally at the exit of a hot water storage tank. FIG. 5(b) shows estimated values and actual measured values of the scale thickness for each 45° of the central angle in the pipe cross-section. The inner radius of the pipe is 50 mm. The period in which the thermal fluid has flown in the pipe (exposure time) is 160 days. As shown in FIG. 5(a), the scale has grown ununiformly with respect to the central angle on the inner surface of the pipe.

As shown in FIG. 5(b), it can be seen that the scale thickness can be estimated with particularly high accuracy at portions in which the scale thickness is relatively uniform with respect to the central angle (at angles 90°, 135°, and 180°). It is considered that the accuracy of the scale thickness estimation is lowered at angle 0° (at the top portion of the pipe) because of strong thermal effects from the thick scale on both sides.

FIG. 6(a) is a photograph in a cross-section at an inlet portion of a pipe (T-shaped pipe) arranged at the exit of a hot water storage tank. FIG. 6(b) shows estimated values and actual measured values of the scale thickness for each 45°. The inner radius of the pipe is 50 mm. The exposure time is 153 days. As shown in FIG. 6(a), the scale has grown ununiformly with respect to the central angle on the inner surface of the pipe.

As shown in FIG. 6(b), it can be seen that the scale thickness can be estimated with particularly high accuracy at portions in which the scale thickness is relatively uniform with respect to the central angle (at angles 90°, 135°, 180°, and 225°). It is considered that the accuracy of the scale thickness estimation is lowered at angle 270° because of the drastic change in scale thickness and strong thermal effects from the nearby scale.

As can be understood from the above results, according to the present embodiment, the scale thickness can be accurately estimated not only in the case of a straight pipe but also in the case of an irregular-shaped pipe such as a T-shaped pipe. It is also possible to get a qualitative tendency of the scale thickness distribution.

Figure 7:
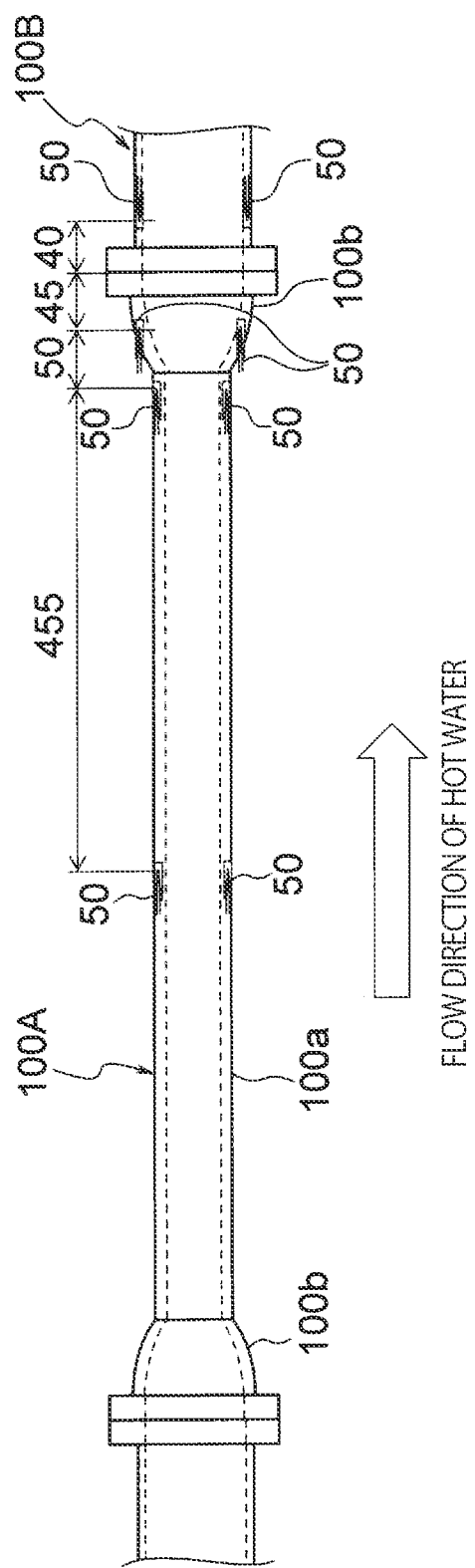
FIG. 7 is a side view of a pipe 100A and a pipe 100B connected to each other.

Next, results of scale thickness estimation using a pipe system in which pipes having different diameters are connected as an evaluation target will be described with reference to FIG. 7 to FIG. 11. As shown in FIG. 7, a pipe 100A having a smaller diameter and a pipe 100B having a larger diameter are connected. The pipe 100A has a smaller diameter portion 100a and increased diameter portions 100b provided at its end portions. The inner radius of the smaller diameter portion 100a is 25 mm. The inner radius of the increased diameter portion 100b is 25 mm to 50 mm. The inner radius of the pipe 100B is 50 mm. The exposure time is 55 days.

As shown in FIG. 7, four portions in total: an intermediate portion of the smaller diameter portion 100a, an end portion of the smaller diameter portion 100a, the increased diameter portion 100b, and an end portion of the pipe 100B are set as monitoring positions. At each monitoring position, a thermocouple 50 for measuring the flow path outer surface temperature is attached to the outer surface of the pipe at each of angle 0° (the top portion of the pipe) and angle 180° (the bottom portion of the pipe).

Figure 8:
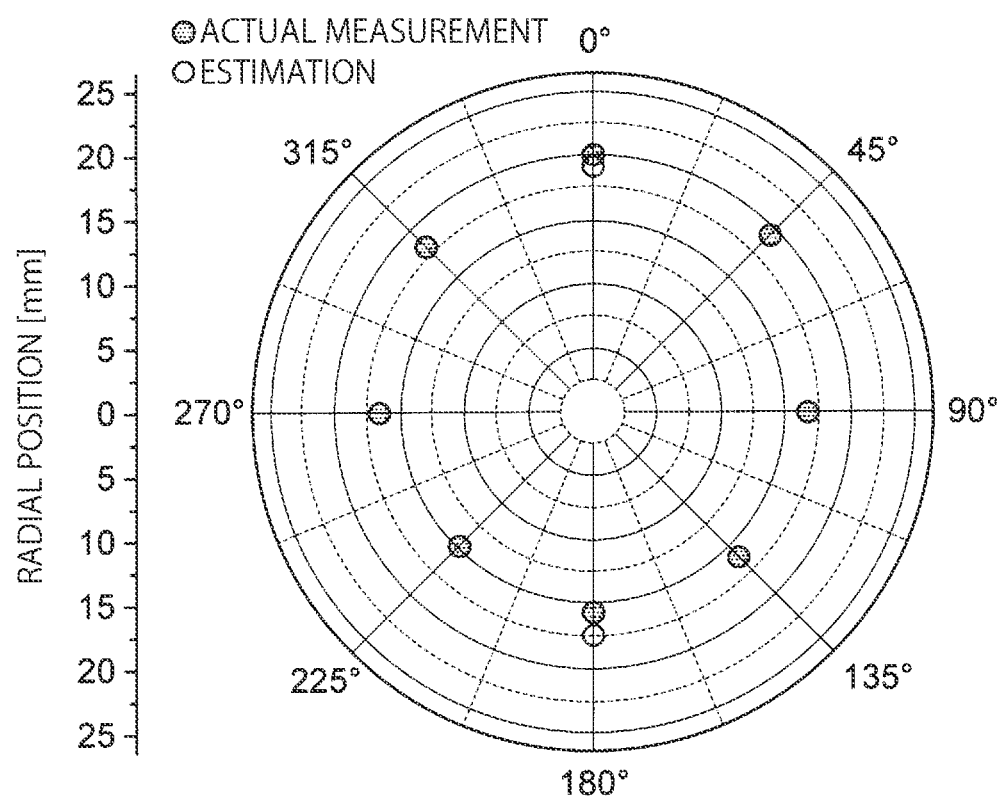
FIG. 8 is a diagram showing estimated values and actual measured values of the thickness of scale depositing at an intermediate portion of a smaller diameter portion 100a of the pipe 100A.
Figure 9:
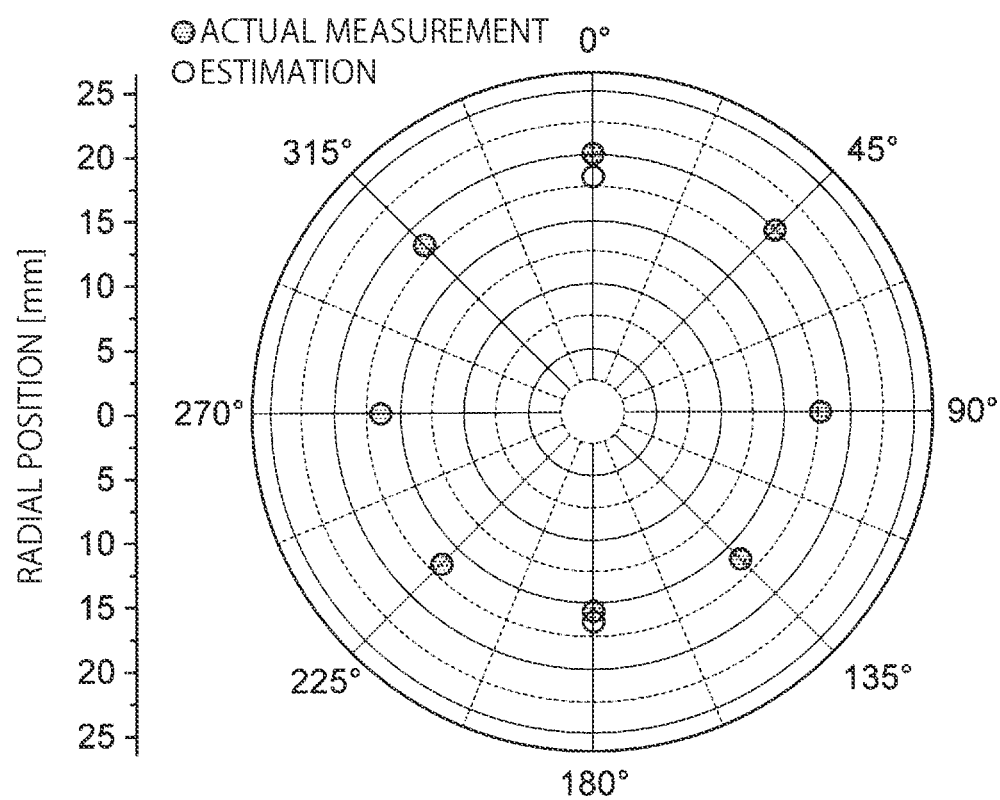
FIG. 9 is a diagram showing estimated values and actual measured values of the thickness of scale depositing at an end portion of the smaller diameter portion 100a of the pipe 100A.
Figure 10:
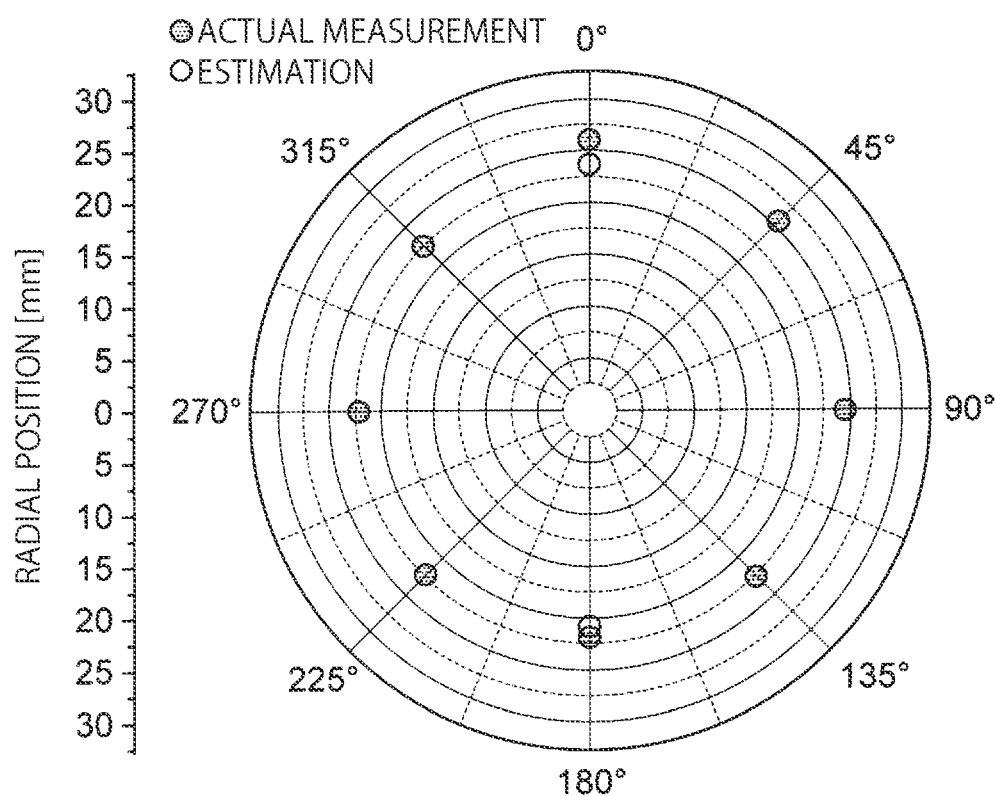
FIG. 10 is a diagram showing estimated values and actual measured values of the thickness of scale depositing at an increased diameter portion 100b of the pipe 100A.
Figure 11:
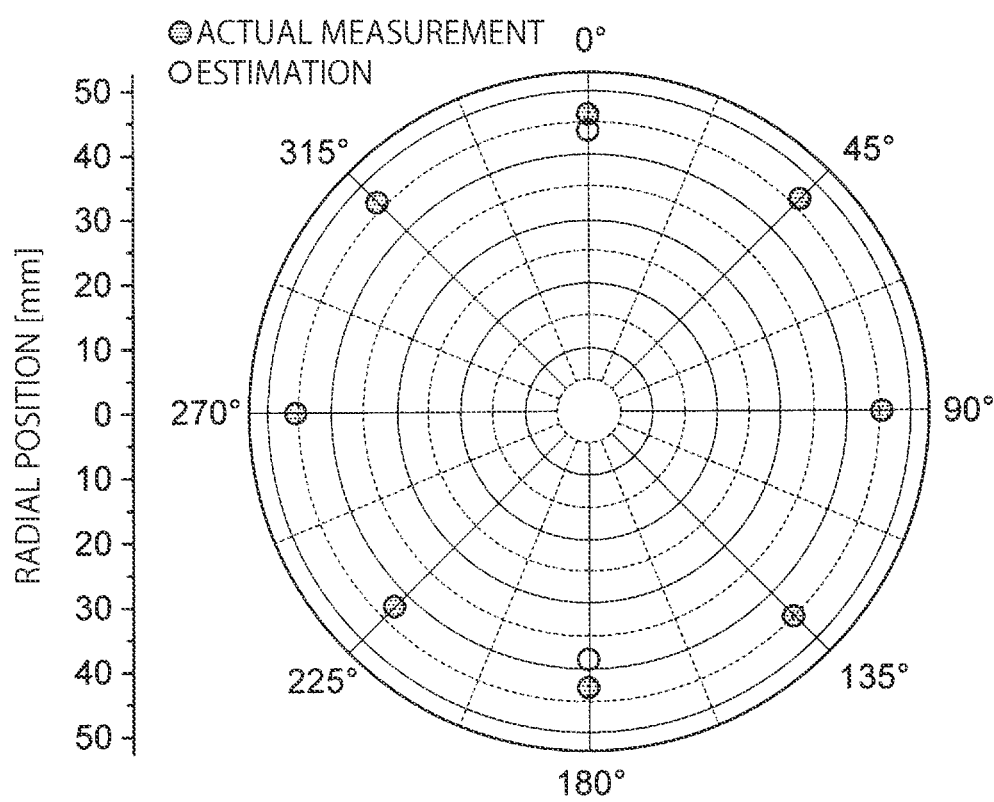
FIG. 11 is a diagram showing estimated values and actual measured values of the thickness of scale depositing at an end portion of the pipe 100B.

FIG. 8 shows estimated values and actual measured values of the scale thickness at the intermediate portion of the smaller diameter portion 100a. FIG. 9 shows estimated values and actual measured values of the scale thickness at the end portion of the smaller diameter portion 100a. FIG. 10 shows estimated values and actual measured values of the scale thickness at the increased diameter portion 100b. FIG. 11 shows estimated values and actual measured values of the scale thickness at the pipe 100B. In the graph of each figure, the actual measured values indicate the values that are actually measured for each 45°.

As can be seen from the results of FIG. 8 to FIG. 11, according to the present embodiment, the scale thickness can be accurately estimated even when the inner diameter of the pipe is small or varies in the longitudinal direction.

Next, estimation results of the scale thickness before and after the removal of the scale depositing on the pipe will be described with reference to FIG. 12. Thermocouples are attached at four positions (at angles 0°, 90°, 180°, and 270°) along the circumferential direction of the pipe, and the scale thickness at each position is estimated. In addition, in this measurement, the measured data is transmitted to a remote personal computer via the Internet, and the estimation of the scale thickness is performed on the personal computer.

Figure 12:
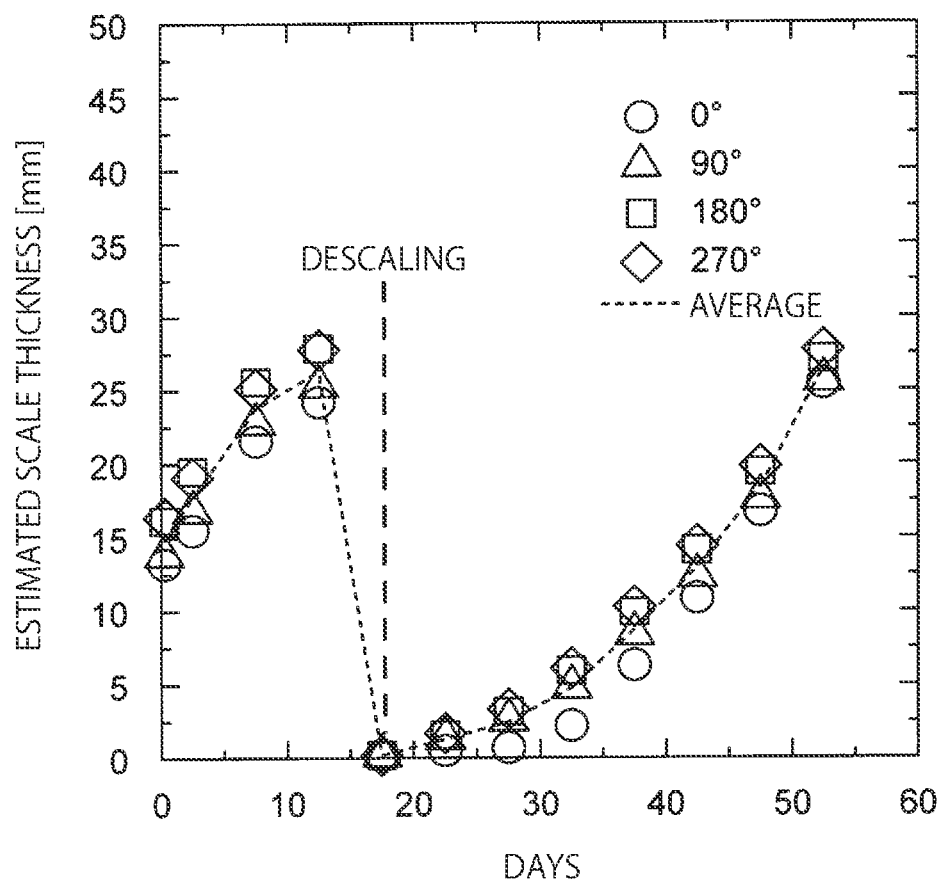
FIG. 12 is a graph showing estimated values of the scale thickness before and after descaling (scale removal).

FIG. 12 shows estimated values of the scale thickness at the respective measurement points and shows the average of the estimated values at the respective positions with a broken line. As shown in FIG. 12, the estimated value of the scale thickness after descaling (removal of the scale forming in the pipe) is approximately 0.

According to the present embodiment, it is therefore possible to accurately determine the scale thicknesses before and after the descaling and the effect of the descaling. In addition, according to the scale thickness estimating system of the present embodiment, real time- and remote-monitoring of the scale deposition condition can be achieved.

As described above, according to the first embodiment, the scale thickness estimating unit 156 estimates the thickness of the scale depositing on inner surface of the pipe based on the fluid temperature, the flow path outer surface temperature, the heat flux, the flow path wall thermal conductivity, and the scale thermal conductivity. That is, there is no need to acquire in advance the scale growth speed and correlations between parameters required for estimating the scale thickness as in the conventional techniques, and the scale thickness can be accurately estimated without using values that are difficult to directly measure such as the scale surface temperature.

According to the present embodiment, it is therefore possible to accurately estimate the thickness of scale formed on the inner surface of a flow path based on values that can be relatively easily measured. As will be understood from the above description, in the present embodiment, the substance of the scale for which the thickness estimation is performed is not particularly limited as long as its thermal conductivity is different from the thermal conductivity of the fluid flowing in the pipe. Therefore, according to the present embodiment, it is possible not only to estimate the thickness of metal oxide formed by the deposition of calcium, silica, and the like contained in hot spring water or the like on the inner surface of the pipe, but also to estimate the thickness of adherents such as wax, paraffine, hydrate, and asphaltene depositing on the inner surface of a pipe for delivering petroleum, for example.

Further, according to the present embodiment, the thickness of scale depositing on the inner surface of a pipe can be accurately estimated not only in the case of a straight pipe but also in the case of an irregular-shaped pipe.

Further, according to the present embodiment, by measuring the flow path outer surface temperature and the heat flux at a plurality of measurement points of the outer surface of the flow path along a predetermined direction, it is possible to get a qualitative tendency of the scale thickness distribution.

Further, according to the present embodiment, it is possible to monitor the scale deposition condition in real time even at a location remote from the location where the pipe is installed.

Note that, although the flow path is a cylindrical flow path formed by a pipe in the above embodiment, the present invention is not limited to this, and the flow path may have a cross-sectional shape other than a circular shape (a quadrilateral shape, an oval shape, or the like).

The flow path may also be formed by a member other than a pipe. The estimation of the thickness of scale formed on the inner surface of a flow path partitioned by a plate will be described below as a modified example of the present embodiment. This modified example can also obtain the same effects as the above embodiment.

Modified Example of First Embodiment

Figure 13:
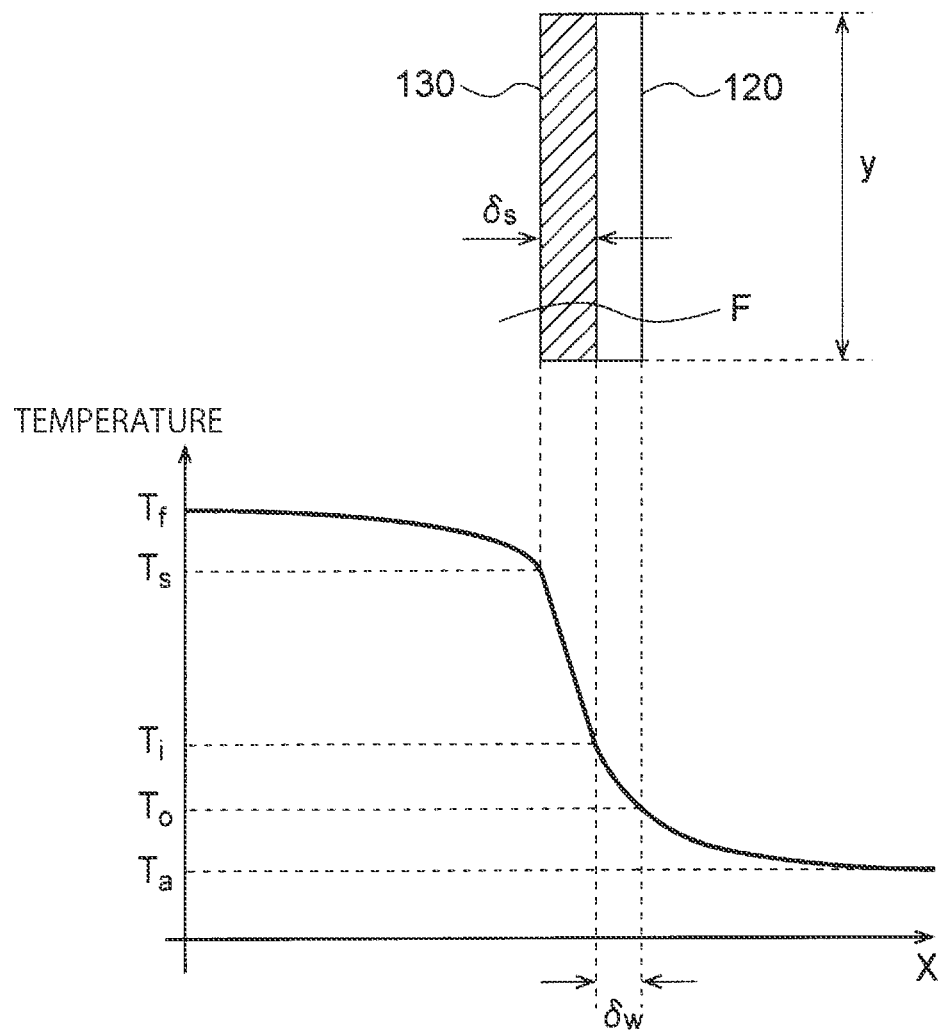
FIG. 13 is a diagram for illustrating temperature distribution inside and outside a plate 120.

As shown in FIG. 13, a system is considered in which a fluid F having a temperature "$T_f$" flows in a flow path partitioned by a plate 120 having a thickness "$\delta_w$" and a scale 130 having a thickness "$\delta_s$" deposits on the inner surface of the plate 120. The fluid F flows in a direction vertical to the paper of FIG. 13.

In this modified example, the scale thickness estimating unit 156 calculates the thickness of the scale 130 depositing on the inner surface of the plate 120 by using equation (11).

[Expression 11]

$$\delta_s \approx k_s \left( \frac{T_f - T_0}{q_o} - \frac{\delta_w}{k_w} \right) \quad (11)$$

where "$\delta_s$" is the thickness of the scale [m], "$k_s$" is the scale thermal conductivity [W/(m·K)], "$k_w$" is the flow path wall thermal conductivity [W/(m·K)], "$q_o$" is the heat flux on the outer surface of the plate [W/m²], "$T_f$" is the fluid temperature [K], "$T_o$" is the temperature of the outer surface of the plate [K], and "$\delta_w$" is the thickness of the plate [m].

As is clear from equation (11), the scale thickness estimating unit 156 estimates the thickness of the scale without using the surface temperature of the scale (temperature "$T_s$" in FIG. 13). Therefore, even in this modified example, the thickness of the scale can be estimated even when the scale surface temperature, which is difficult to measure, is unknown.

The method for deriving equation (11) will now be described.

When a relationship of "$T_f$">"$T_a$" ("$T_a$" is the flow path surrounding temperature) holds in the steady state, an amount of heat transfer "Q" from the inside to the outside of the plate 120 resulting from this temperature difference is given by equation (12).

[Expression 12]

$$Q = \frac{T_f - T_a}{\frac{1}{yL}\left(\frac{1}{h_f} + \frac{\delta_s}{k_s} + \frac{\delta_w}{k_w} + \frac{1}{h_a}\right)} \quad (12)$$

where "Q" is the amount of heat transfer [W], "y" is the length of the plate in the width direction [m], "L" is the length in the flow direction [m], "$h_f$" is the thermal conductivity between the scale and the fluid [W/(m²·K)], and "$h_a$" is the thermal conductivity between the outer surface of the plate and the surrounding space of the flow path [W/(m²·K)].

In equation (12), the first term of the denominator on the right side indicates the thermal resistance due to heat transfer from the thermal fluid to the scale, the second term indicates the thermal resistance of the scale, the third term indicates the thermal resistance of the flow path wall (plate), and the fourth term indicates the thermal resistance due to heat transfer from the outer surface of the plate to the surrounding space.

Defining the heat flux on the outer surface of the plate as "$q_o$", a relationship of Q=yLq$_o$ holds. Using this relationship, equation (13) is obtained from equation (12).

[Expression 13]

$$q_o = \frac{T_f - T_a}{\frac{1}{h_f} + \frac{\delta_s}{k_s} + \frac{\delta_w}{k_w} + \frac{1}{h_a}} \quad (13)$$

By transforming equation (13), equation (14) is obtained.

[Expression 14]

$$\delta_s = k_s\left(\frac{T_f - T_a}{q_o} - \frac{1}{h_f} - \frac{\delta_w}{k_w} - \frac{1}{h_a}\right) \quad (14)$$

Incidentally, in equation (14), equation (15) holds between the thermal conductivity "$h_f$" and the heat flux "$q_o$".

[Expression 15]

$$h_f = \frac{Q}{yL(T_f - T_s)} = \frac{q_o}{T_f - T_s} \quad (15)$$

where "$T_s$" is the surface temperature of the scale.

Further, in equation (14), equation (16) holds between the thermal conductivity "$h_a$" and the heat flux "$q_o$".

[Expression 16]

$$h_a = \frac{Q}{yL(T_o - T_a)} = \frac{q_o}{T_0 - T_a} \quad (16)$$

Substituting equation (15) and equation (16) into equation (14) gives equation (17).

[Expression 17]

$$\delta_s = k_s\left(\frac{T_s - T_o}{q_o} - \frac{\delta_w}{k_w}\right) \quad (17)$$

The surface temperature "$T_s$" of the scale is dependent on the thermal conductivity "$h_f$" between the scale and the thermal fluid as indicated in equation (15), and varies with physical property values and the flow rate of the thermal fluid flowing in the flow path partitioned by the plate and interfacial structures on the scale. On the other hand, the thermal resistance due to heat transfer from the thermal fluid to the scale is significantly smaller than those of the scale and other thermal resistance components. Therefore, if some errors are allowed in a system with the deposited scale, "$T_s$" in equation (17) can be approximated by "$T_f$". In this manner, equation (11) is obtained.

Second Embodiment

Next, a scale thickness estimating system according to a second embodiment will be described.

A scale thickness estimating system 1A according to the present embodiment is a system for estimating the thickness of scale and for determining and notifying a timing for removing the scale depositing on the inner surface of a flow path (a maintenance timing of the flow path). The second embodiment will be described below mainly for differences from the first embodiment. Note that, although the flow path is a cylindrical flow path formed by a pipe in the present embodiment, there is no such limitation, and it may be a flow path partitioned by a plate or the like.

Figure 14:
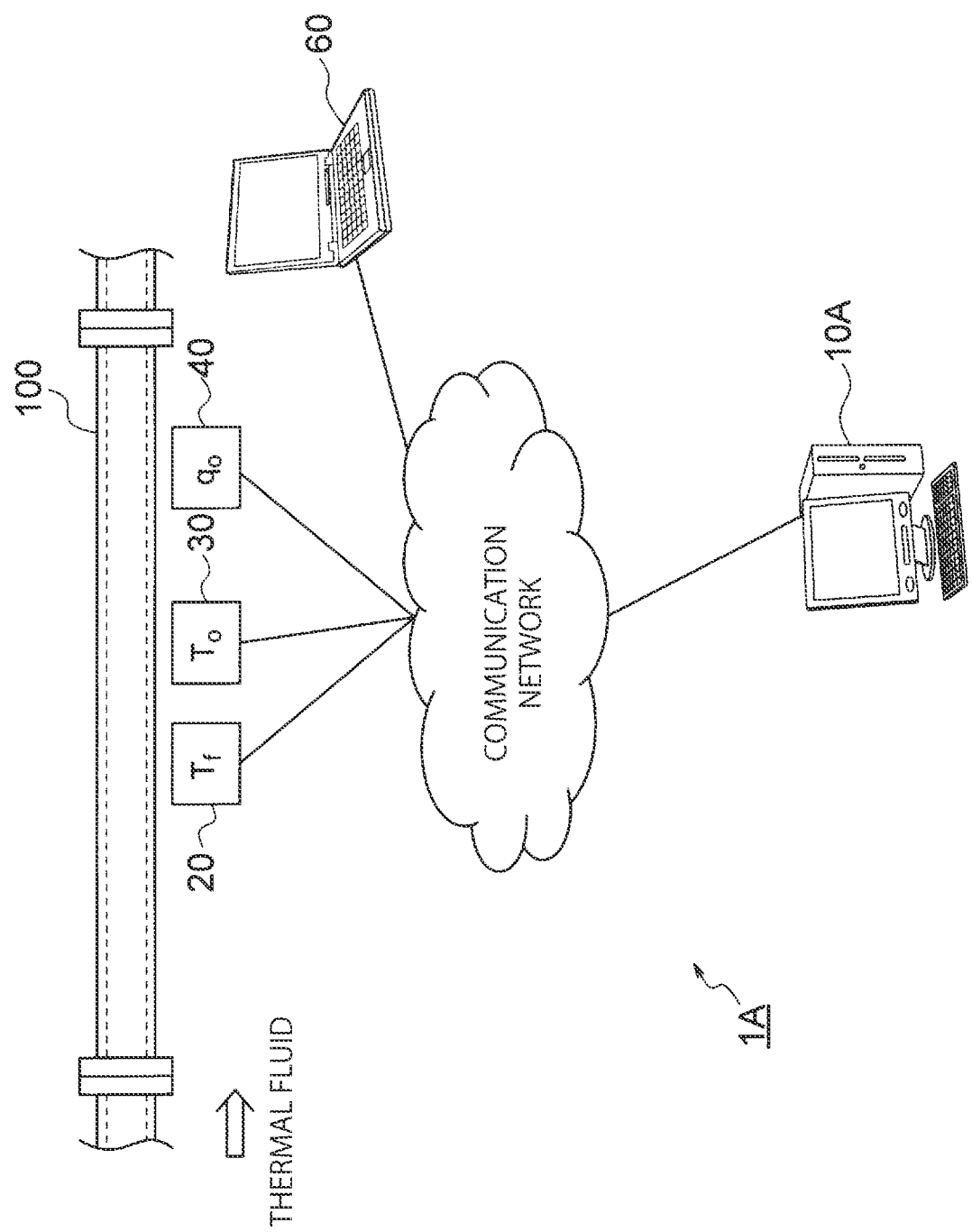
FIG. 14 is a diagram showing a schematic arrangement of a scale thickness estimating system 1A according to a second embodiment.

As shown in FIG. 14, the scale thickness estimating system 1A includes an information-processing apparatus 10A, a fluid temperature measuring unit 20, a flow path outer surface-temperature measuring unit 30, a heat flux measuring unit 40, and an information-processing apparatus 60. In the present embodiment, the information-processing apparatus 10 is communicatively connected to the fluid temperature measuring unit 20, the flow path outer surface-temperature measuring unit 30, and the heat flux measuring unit 40 via a communication network. Further, the information-processing apparatus 10A and the information-processing apparatus 60 are connected via a communication network.

The information-processing apparatus 10A estimates the thickness of the scale depositing on the inner surface of the pipe 100 by using data measured by the fluid temperature measuring unit 20, the flow path outer surface-temperature measuring unit 30, and the heat flux measuring unit 40, and determines a maintenance timing of the pipe 100. When the maintenance timing has arrived, the information-processing apparatus 60 is notified of that.

The information-processing apparatus 60 informs a worker of the maintenance timing notified from the information-processing apparatus 10 by means of an image or a sound.

Each of the information-processing apparatus 10A and the information-processing apparatus 60 is a desktop personal computer or a laptop personal computer, but may also be a tablet terminal, a smartphone, or the like.

Note that, if the fluid temperature measuring unit 20, the flow path outer surface-temperature measuring unit 30, and the heat flux measuring unit 40 are constituted as an apparatus having a communication function and an information output function (such as an IoT device), these measurement units may be function as the information-processing apparatus 60. Further, if the information-processing apparatus 10A is arranged near the pipe 100 or the like, the information-processing apparatus 10A and the information-processing apparatus 60 may be constituted as a single information-processing apparatus.

Next, the details of the information-processing apparatus 10A will be described with reference to FIG. 15.

Figure 15:
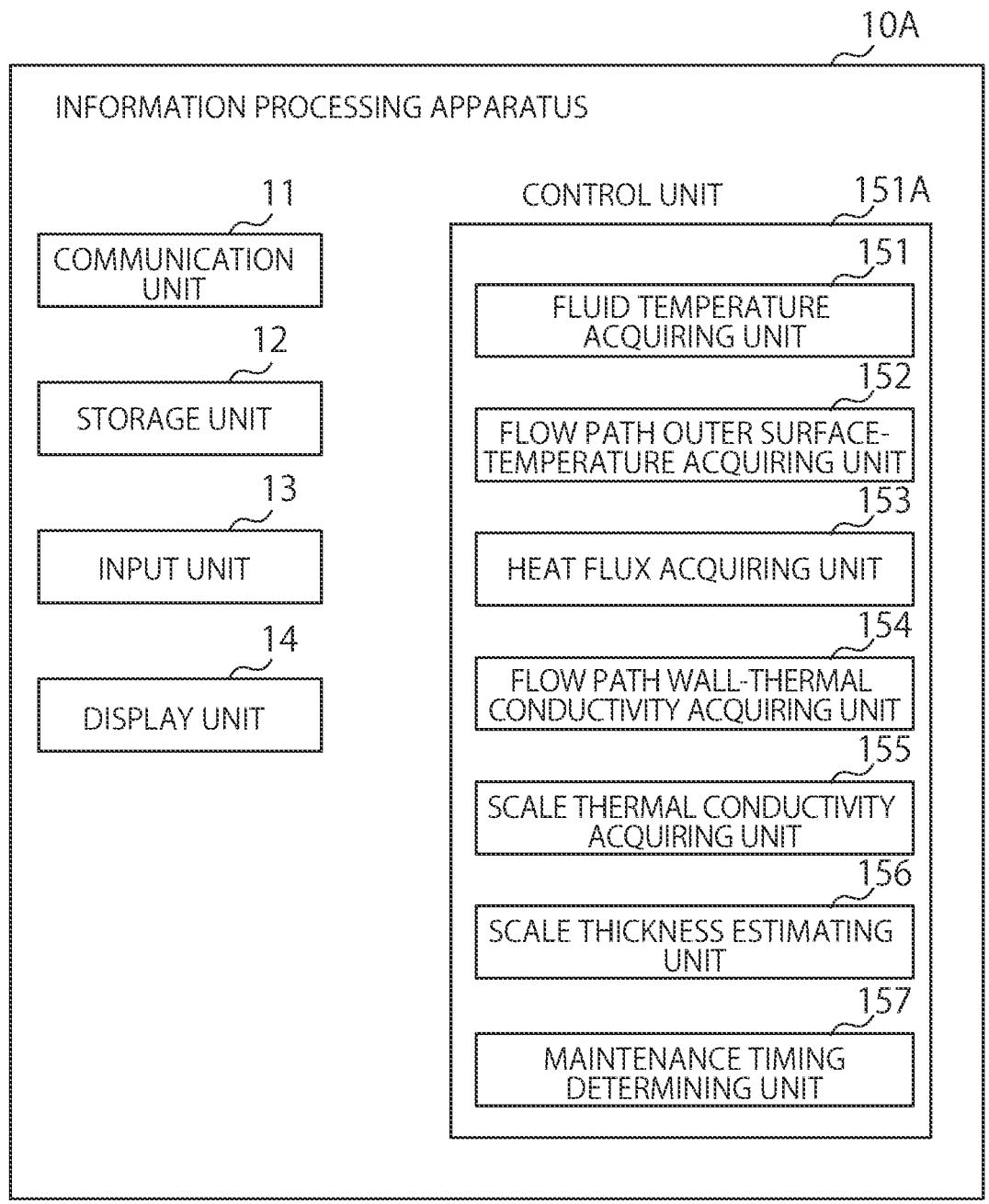
FIG. 15 is a functional block diagram of an information-processing apparatus 10A according to the second embodiment.

As shown in FIG. 15, the information-processing apparatus 10A includes a communication unit 11, a storage unit 12, an input unit 13, a display unit 14, and a control unit 15A. The communication unit 11, the storage unit 12, the input unit 13, and the display unit 14 are the same as those in the first embodiment, and the detailed descriptions thereof will be omitted.

As shown in FIG. 15, the control unit 15A includes a fluid temperature acquiring unit 151, a flow path outer surface-temperature acquiring unit 152, a heat flux acquiring unit 153, a flow path wall-thermal conductivity acquiring unit 154, a scale thermal conductivity acquiring unit 155, a scale thickness estimating unit 156, and a maintenance timing determining unit 157. In the present embodiment, each unit of the control unit 15A is implemented by a processor in the information-processing apparatus 10 executing a predetermined program. Note that at least one unit of the control unit 15A may be constituted by hardware.

Among the units of the control unit 15A, the fluid temperature acquiring unit 151, the flow path outer surface-temperature acquiring unit 152, the heat flux acquiring unit 153, the flow path wall-thermal conductivity acquiring unit 154, and the scale thermal conductivity acquiring unit 155 are the same as those in the first embodiment, and the detailed descriptions thereof will be omitted.

As described in the first embodiment, the scale thickness estimating unit 156 estimates the thickness of the scale forming in the pipe 100 based on the fluid temperature, the flow path outer surface temperature, the heat flux, the flow path wall thermal conductivity, and the scale thermal conductivity. In the present embodiment, the scale thickness estimating unit 156 estimates the scale thickness at regular time intervals, and stores the estimated scale thickness in the storage unit 12. In this manner, the storage unit 12 stores time-series data about the estimated values of the scale thickness.

The maintenance timing determining unit 157 determines the maintenance timing based on the time-series data about the scale thickness estimated by the scale thickness estimating unit 156.

More specifically, the maintenance timing determining unit 157 derives a prediction curve by fitting the time-series data about the estimated scale thickness or time-series data based on the time-series data (such as time-series data about normalized scale thickness, which will be described later) to a predetermined function. The prediction curve is a curve for predicting the scale thickness. The function used for deriving the prediction curve is a function that asymptotically approaches a predetermined value over time.

The derivation of the prediction curve will be described in detail. In the present embodiment, the maintenance timing determining unit 157 obtains the prediction curve by fitting time-series data about normalized scale thickness to a function "tanh" that asymptotically approaches 1 over time. Here, the normalized scale thickness is a dimensionless value obtained by normalizing the scale thickness, for example, a value obtained by dividing an estimated value of the scale thickness by the inner radius of the pipe. When the normalized scale thickness is 1, it indicates that the pipe is blocked with the scale.

Equation (18) represents an example of a correlation equation for the prediction curve of the normalized scale thickness.

[Expression 18]

$$\delta^* = \tanh(C \cdot t^n) \qquad (18)$$

where "$\delta^*$" is the normalized scale thickness, "C" is a coefficient, "t" is the number of exposure days, and "n" is a degree.

The normalized scale thickness "$\delta^*$" is given by "$\delta/r_i$" in the case of a cylindrical flow path formed by a pipe, and is given by "$2\delta/\Delta x$" in the case of a flow path partitioned by a plate. "$\delta$" is the estimated value of the scale thickness, "$r_i$" is the inner radius of the pipe. "$\Delta x$" is the distance between opposing plates (that is, the gap of the flow path).

Note that the function used for deriving the prediction curve is not limited to "tanh" as long as it is a function that asymptotically approaches a predetermined value over time. For example, a function "exp" may be used. A correlation equation for the prediction curve of the normalized scale thickness in this case is represented by equation (19).

[Expression 19]

$$\delta^* = 1 - \exp\left(-\frac{t^n}{C}\right) \qquad (19)$$

where "$\delta^*$" is the normalized scale thickness, "C" is a coefficient, "t" is the number of exposure days, and "n" is a degree.

The prediction curve of the scale thickness is derived by obtaining the coefficient "C" and the degree "n" by fitting the time-series data about the normalized scale thickness using equation (18) or equation (19).

After the prediction curve is derived, the maintenance timing determining unit 157 obtains the number of exposure days (exposure time) in which the scale thickness reaches a predetermined thickness (for example, $\delta^*=0.3$) based on the prediction curve. The maintenance timing determining unit 157 then determines (decides) the maintenance timing based on the obtained number of exposure days. For example, the day a predetermined number of days before the obtained number of exposure days is set as the maintenance timing.

When the maintenance timing arrives subsequently, the maintenance timing determining unit 157 makes a notification prompting maintenance of the pipe 100 to the information-processing apparatus 60. Note that the maintenance timing determining unit 157 may notify the information-processing apparatus 60 of the maintenance timing when the maintenance timing is determined. In this case, the information-processing apparatus 60 confirms the arrival of the maintenance timing and informs the user of that by means of an image or a sound.

Figure 16:
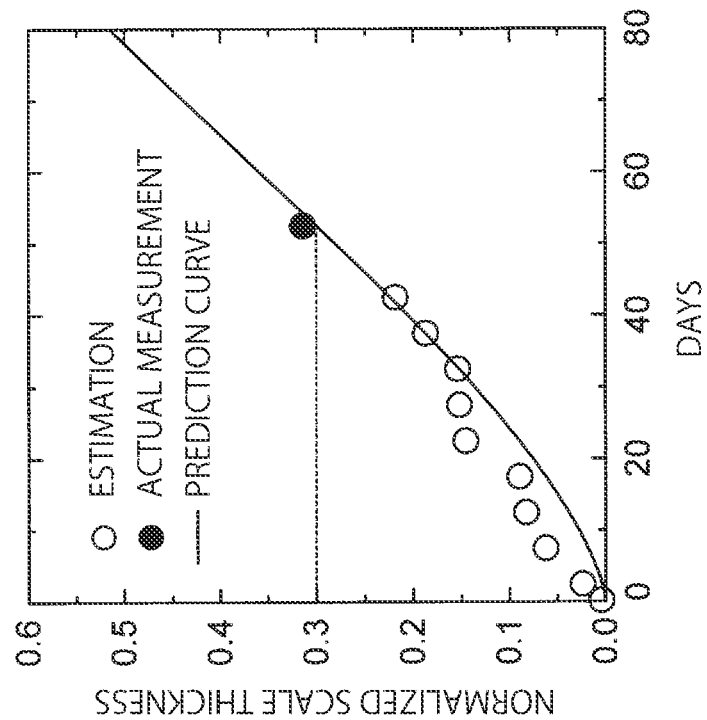
FIGS. 16(a) and (b) are graphs showing estimated values of the scale thickness, prediction curves obtained from the estimated values, and actual measured values of the scale thickness.
Figure 16:
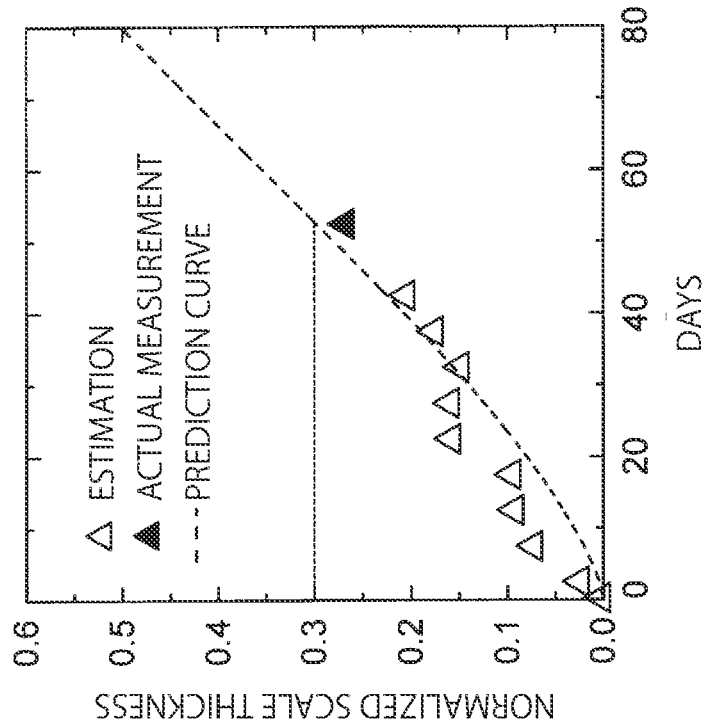

FIG. 16(a) and FIG. 16(b) show estimated values of the scale thickness, prediction curves derived based on the estimated values, and actual measured values of the scale thickness in the case where a pipe arranged horizontally is used as a target. It is confirmed from the results shown in FIG. 16(a) and FIG. 16(b) that the scale thickness actually measured is close to the prediction curve and the maintenance timing can be accurately determined.

<Method for Determining Maintenance Timing>

Figure 17:
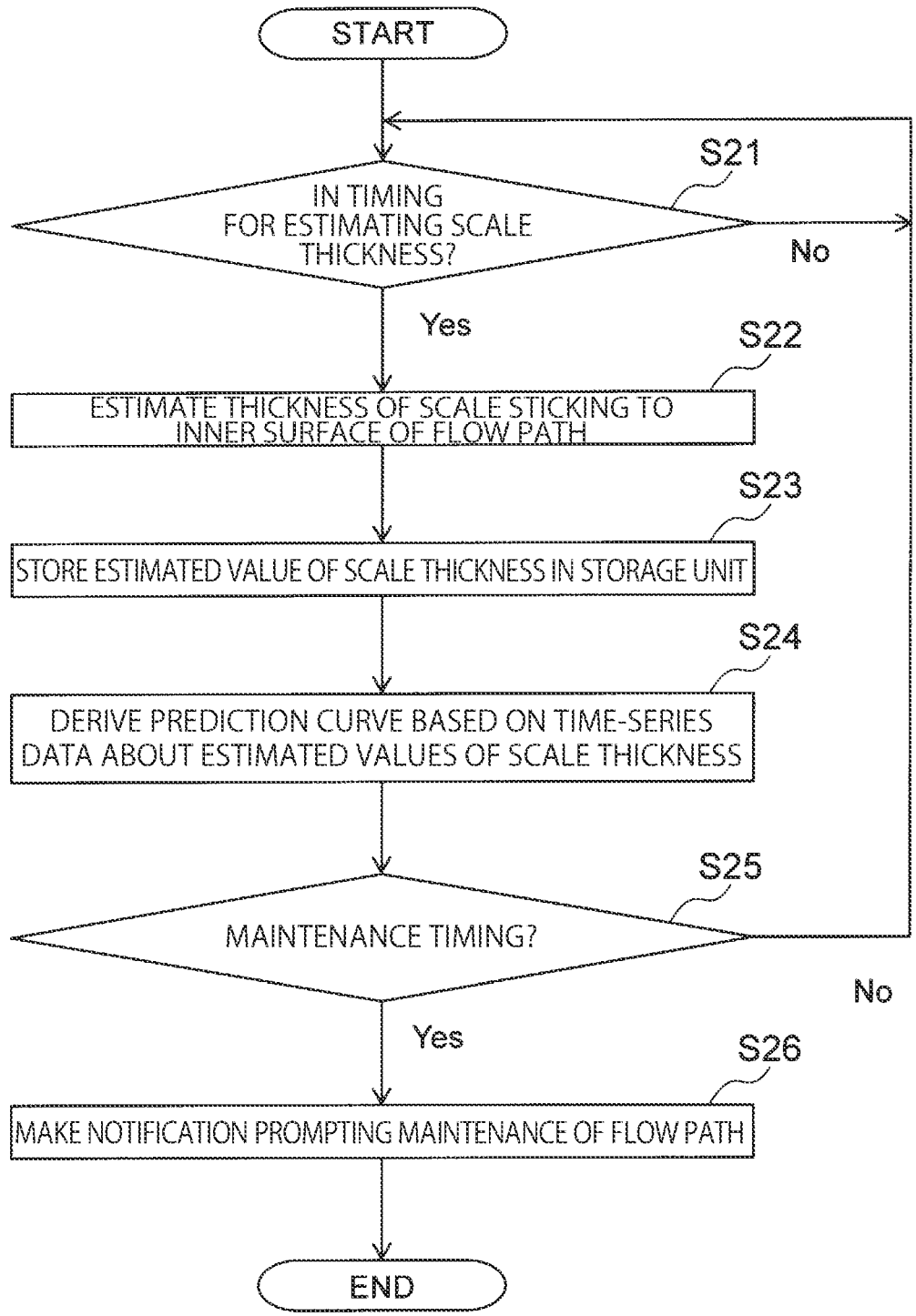
FIG. 17 is a flow chart of a method for determining a maintenance timing.

An example of a method for determining the maintenance timing according to the present embodiment will be described with reference to the flow chart of FIG. 17.

The control unit 15A of the information-processing apparatus 10A determines whether it is a timing for estimating the scale thickness (step S21). For example, it determines whether a predetermined time in a day (such as noon) has come. If it is determined that it is a timing for estimating the scale thickness (S21: Yes), the scale thickness estimating unit 156 estimates the thickness of the scale depositing on the inner surface of the flow path (flow path wall) (step S22). In this step, for example, the processing flow in the flow chart of FIG. 4 is performed. On the other hand, if it is determined that it is not yet a timing for estimating the scale thickness (S21: No), the flow returns to step S21.

After estimating the scale thickness, the scale thickness estimating unit 156 stores the estimated value of the scale thickness in the storage unit 12 (step S23). Data stored in the storage unit 12 may be the estimated value of the scale thickness or may be a value obtained by normalizing the estimated value.

Subsequently, a prediction curve is derived based on time-series data about estimated values of the scale thickness (step S24). The derivation of the prediction curve is performed by the foregoing method. The prediction curve may be derived based on the time-series data about the estimated values of the scale thickness estimated in step S22, or the prediction curve may be derived based on time-series data about the normalized scale thicknesses obtained by normalizing the estimated values of the scale thickness.

After the prediction curve is derived, the maintenance timing determining unit 157 determines whether a maintenance timing of the flow path has arrived (step S25). In this step, the number of exposure days in which the scale thickness reaches a predetermined thickness is obtained based on the prediction curve, and whether the day a predetermined number of days before the number of exposure days has arrived is determined. Note that the determination method is not limited to this. For example, the number of exposure days in which the normalized scale thickness reaches a predetermined value (for example, $\delta^*=0.25$) may be obtained based on the prediction curve, and the determination may be made by whether the number of exposure days has elapsed.

If it is determined that the maintenance timing has arrived (S25: Yes), the maintenance timing determining unit 157 makes a notification prompting maintenance of the flow path (step.S26). This notification is made to the information-processing apparatus 60. The display unit 14 of the information-processing apparatus 10A may display information that the maintenance timing has arrived.

As described above, in the second embodiment, the maintenance timing determining unit 157 determines a maintenance timing of the flow path based on the time-series data about estimated values of the scale thickness. In this manner, the maintenance of the flow path can be performed at an appropriate timing.

The embodiments of the present invention have been described above. Although the fluid flowing in the flow path is a thermal fluid such as warm water in the above embodiments, the present invention is not limited to this. For example, the fluid flowing in the flow path may be a cold fluid having a temperature lower than the flow path surrounding temperature. That is, the scale thickness estimation according to the present invention can be performed as long as there is a transfer of heat from the inside to the outside of the flow path or from the outside to the inside of the flow path such as a transfer of heat along the radial direction of the pipe (that is, the thickness direction of the pipe wall). In addition, the fluid is not limited to a liquid, and may be a gas such as vapor.

While a person skilled in the art may arrive at additional effects and various modifications of the present invention based on the above description, the aspects of the present invention are not limited to the above-described embodiments. Various additions, changes, and partial deletions are possible without departing from the conceptual idea and spirit of the present invention derived from the contents defined in the claims and their equivalents.

At least part of the scale thickness estimating system described in the above embodiments may be constituted by hardware, or may be constituted by software. If it is constituted by software, a program for implementing the function of at least part of the scale thickness estimating system may be stored in a recording medium such as a flexible disk or a CD-ROM and read by a computer for execution. The recording medium is not limited to a removable one such as a magnetic disk or an optical disk, and may be a fixed recording medium such as a hard disk device or a memory.

In addition, a program for implementing the function of at least part of the scale thickness estimating system may be distributed via a communication circuit (including wireless communication) such as the Internet. Further, the program may be distributed via a wired line or a wireless line such as the Internet or in a recording medium after being encrypted, modulated, or compressed.

REFERENCE SIGNS LIST

1, 1A scale thickness estimating system
10, 10A information-processing apparatus
11 communication unit
12 storage unit
13 input unit
14 display unit
15, 15A control unit
   151 fluid temperature acquiring unit
   152 flow path outer surface-temperature acquiring unit
   153 heat flux acquiring unit
   154 flow path wall-thermal conductivity acquiring unit
   155 scale thermal conductivity acquiring unit
   156 scale thickness estimating unit
   157 maintenance timing determining unit
20 fluid temperature measuring unit
30 flow path outer surface-temperature measuring unit
40 heat flux measuring unit
50 thermocouple
60 information-processing apparatus
100, 100A, 100B pipe
100a smaller diameter portion
100b increased diameter portion
110, 130 scale
120 plate
F thermal fluid

The invention claimed is:

1. A scale thickness estimating system, the system comprising:
   a thermocouple configured to penetrate an outer surface of a member that forms a flow path of a fluid and acquire a temperature of the fluid flowing in the flow path;
   a thermometer that measures a temperature of the outer surface of the member;

a heat flux meter that acquires a heat flux on the outer surface of the member; and a processor configured to:
acquire a flow path wall thermal conductivity of the member;
acquire a scale thermal conductivity of scale depositing on an inner surface of the member; and
estimate a thickness of the scale based on the temperature of the fluid, the temperature of the outer surface, the heat flux, the flow path wall thermal conductivity, the scale thermal conductivity and a thickness of the member.

2. The scale thickness estimating system according to claim 1, wherein the thickness of the scale is estimated without using a surface temperature of the scale.

3. The scale thickness estimating system according to claim 1, wherein
the member is a pipe and the flow path is a cylindrical flow path formed by the pipe, and
the thickness of the scale is estimated based on equation (1):

[Expression 1]

$$\delta_s \approx r_i \left[ 1 - \cfrac{1}{\exp\left[\cfrac{k_s}{r_o}\left\{\cfrac{T_f - T_o}{q_o} - \cfrac{r_o \ln(r_o/r_i)}{k_w}\right\}\right]} \right] \quad (1)$$

where "$\delta_s$" is the thickness of the scale, "$r_i$" is an inner radius of the pipe, "$r_o$" is an outer radius of the pipe, "$k_s$" is the scale thermal conductivity, "$k_w$" is the flow path wall thermal conductivity, "$q_o$" is the heat flux, "$T_f$" is the temperature of the fluid, and "$T_o$" is a temperature of an outer surface of the pipe.

4. The scale thickness estimating system according to claim 1, wherein
the member is a plate and the flow path is a flow path partitioned by the plate, and
the thickness of the scale is estimated based on equation (2):

[Expression 2]

$$\delta_s \approx k_s \left( \cfrac{T_f - T_o}{q_o} - \cfrac{\delta_w}{k_w} \right) \quad (2)$$

where "$\delta_s$" is the thickness of the scale, "$k_s$" is the scale thermal conductivity, "$k_w$" is the flow path wall thermal conductivity, "$q_o$" is the heat flux, "$T_f$" is the temperature of the fluid, "$T_o$" is a temperature of an outer surface of the plate, and "$\delta_w$" is a thickness of the plate.

5. The scale thickness estimating system according to claim 1, wherein:
the thermometer is configured to acquire flow path outer surface temperature distribution by measuring the temperature of the outer surface of the flow path along a predetermined direction of the member,
the heat flux meter is configured to acquire heat flux distribution obtained by measuring the heat flux on the outer surface of the flow path along the predetermined direction of the member, and
the processor is configured to estimate distribution of the thickness of the scale along the predetermined direction of the flow path based on the flow path outer surface temperature distribution and the heat flux distribution.

6. The scale thickness estimating system according to claim 1, the processor is further configured to determine a maintenance timing of the flow path based on time-series data about the estimated thickness of the scale.

7. The scale thickness estimating system according to claim 6, wherein the processor is further configured to derive a prediction curve for predicting the thickness of the scale depositing on the inner surface of the member by fitting the time-series data or time-series data based on the time-series data to a function.

8. The scale thickness estimating system according to claim 7, wherein the function is a function that asymptotically approaches a predetermined value over time.

9. The scale thickness estimating system according to claim 7, wherein the processor obtains an exposure time in which the thickness of the scale is expected to reach a predetermined thickness based on the prediction curve, and determines the maintenance timing based on the exposure time.

10. A scale thickness estimating method, the method comprising:
acquiring, by a thermocouple penetrating an outer surface of a member that form a flow path of a fluid, a temperature of the fluid;
measure, by a thermometer, a temperature of the outer surface of the member;
acquiring, by a heat flux, a heat flux on the outer surface of the member;
acquiring, by a processor, a flow path wall thermal conductivity of the member;
acquiring, by the processor, a scale thermal conductivity of scale depositing on an inner surface of the flow path; and
estimating, by the processor, a thickness of the scale based on the temperature of the fluid, the temperature of the outer surface, the heat flux, the flow path wall thermal conductivity, the scale thermal conductivity and a thickness of the member.

11. A non-transitory computer-readable storage medium storing a scale thickness estimating program causing a computer to perform a method, the method comprising:
acquiring a temperature of a fluid flowing in a flow path from a thermocouple penetrating an outer surface of a member that forms the flow path;
acquiring a temperature of the outer surface of the member from a thermometer;
acquiring a heat flux on the outer surface of the member from a heat flux meter;
acquiring a flow path wall thermal conductivity of the member;
acquiring a scale thermal conductivity of scale depositing on an inner surface of the member; and
estimating a thickness of the scale based on the temperature of the fluid, the temperature of the outer surface, the heat flux, the flow path wall thermal conductivity, the scale thermal conductivity and a thickness of the member.

* * * * *